US012432253B2

(12) United States Patent
Vissamsetty et al.

(10) Patent No.: US 12,432,253 B2
(45) Date of Patent: *Sep. 30, 2025

(54) DECEIVING ATTACKERS ACCESSING NETWORK DATA

(71) Applicant: Sentinelone, Inc., Mountain View, CA (US)

(72) Inventors: Venu Vissamsetty, San Jose, CA (US); Anil Gupta, Bangalore (IN); Harinath Vishwanath Ramchetty, Bangalore (IN)

(73) Assignee: SentinelOne, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,358

(22) Filed: Apr. 16, 2024

(65) Prior Publication Data

US 2024/0356971 A1 Oct. 24, 2024

Related U.S. Application Data

(63) Continuation of application No. 18/183,022, filed on Mar. 13, 2023, now Pat. No. 11,997,139, which is a
(Continued)

(51) Int. Cl.
*H04L 9/40* (2022.01)
*G06F 21/55* (2013.01)
(Continued)

(52) U.S. Cl.
CPC ........ *H04L 63/1491* (2013.01); *G06F 21/554* (2013.01); *G06F 21/566* (2013.01);
(Continued)

(58) Field of Classification Search
CPC . H04L 63/1491; H04L 41/12; H04L 61/4505; H04L 61/5007; H04L 63/1416;
(Continued)

(56) References Cited

U.S. PATENT DOCUMENTS 4,979,118 A 12/1990 Kheradpir
5,311,593 A 5/1994 Carmi
(Continued)

FOREIGN PATENT DOCUMENTS

CN 103607399 A 2/2014
CN 109446755 A 3/2019
(Continued)

OTHER PUBLICATIONS

Chen et al., "MitM attack by name collision: Cause analysis and vulnerability assessment in the new gTLD era." Security and Privacy (SP), 2016 IEEE Symposium on. IEEE (2016).
(Continued)

*Primary Examiner* — Cheng-Feng Huang
(74) *Attorney, Agent, or Firm* — Perkins Coie LLP

(57) ABSTRACT

Endpoints in a network execute a sensor module that intercepts commands to obtain information regarding a remote network resource. The sensor module compares a source of commands to a sanctioned list of applications. If the source is not sanctioned, then a simulated response can be provided to the source that references a decoy server.

20 Claims, 18 Drawing Sheets

Related U.S. Application Data continuation of application No. 16/849,813, filed on Apr. 15, 2020, now Pat. No. 11,695,800, which is a continuation-in-part of application No. 16/543,189, filed on Aug. 16, 2019, now Pat. No. 11,616,812, which is a continuation-in-part of application No. 15/383,522, filed on Dec. 19, 2016, now Pat. No. 10,599,842.

(51) Int. Cl.
| | |
|---|---|
| *G06F 21/56* | (2013.01) |
| *H04L 41/12* | (2022.01) |
| *H04L 61/4505* | (2022.01) |
| *H04L 61/5007* | (2022.01) |
| *H04L 61/4523* | (2022.01) |

(52) U.S. Cl.
CPC .......... *H04L 41/12* (2013.01); *H04L 61/4505* (2022.05); *H04L 61/5007* (2022.05); *H04L 63/1416* (2013.01); *G06F 2221/2123* (2013.01); *H04L 61/4523* (2022.05)

(58) Field of Classification Search
CPC . H04L 61/4523; G06F 21/554; G06F 21/566; G06F 2221/2123
See application file for complete search history.

(56) References Cited

U.S. PATENT DOCUMENTS

| | | |
|---|---|---|
| 5,754,938 A | 5/1998 | Herz et al. |
| 6,026,474 A | 2/2000 | Carter et al. |
| 6,154,844 A | 11/2000 | Touboul et al. |
| 6,157,953 A | 12/2000 | Chang et al. |
| 6,728,716 B1 | 4/2004 | Bhattacharya et al. |
| 6,804,780 B1 | 10/2004 | Touboul |
| 6,836,888 B1 | 12/2004 | Basu et al. |
| 7,076,696 B1 | 7/2006 | Stringer |
| 7,093,239 B1 | 8/2006 | Van der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,665,139 B1 | 2/2010 | Szor et al. |
| 7,710,933 B1 | 5/2010 | Sundaralingam et al. |
| 7,739,516 B2 | 6/2010 | Bender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,958,549 B2 | 6/2011 | Nakae et al. |
| 7,975,018 B2 | 7/2011 | Unrau et al. |
| 7,984,129 B2 | 7/2011 | Vaught |
| 8,015,605 B2 | 9/2011 | Yegneswaran |
| 8,024,795 B2 | 9/2011 | Newton |
| 8,042,186 B1 | 10/2011 | Polyakov et al. |
| 8,056,134 B1 | 11/2011 | Ogilvie |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz |
| 8,205,035 B2 | 6/2012 | Reddy et al. |
| 8,230,505 B1 | 7/2012 | Ahrens et al. |
| 8,239,947 B1 | 8/2012 | Glick et al. |
| 8,296,842 B2 | 10/2012 | Singh et al. |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,578 B1 | 9/2013 | Zhou et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B1 | 5/2014 | Vincent |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,806,638 B1 | 8/2014 | Mani |
| 8,821,242 B2 | 9/2014 | Hinman et al. |
| 8,839,369 B1 | 9/2014 | Dai et al. |
| 8,844,041 B1 | 9/2014 | Kienzle et al. |
| 8,849,880 B2 | 9/2014 | Thelen |
| 8,850,582 B2 | 9/2014 | Endoh et al. |
| 8,880,435 B1 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 8/2016 | Feghali et al. |

(56) References Cited

U.S. PATENT DOCUMENTS

| | | |
|---|---|---|
| 9,413,721 B2 | 8/2016 | Morris et al. |
| 9,420,002 B1 | 8/2016 | McGovern et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,705,904 B1 | 7/2017 | Davis et al. |
| 9,710,648 B2 | 7/2017 | Weingarten |
| 9,712,547 B2 | 7/2017 | Touboul et al. |
| 9,749,349 B1 | 8/2017 | Czarny et al. |
| 9,769,204 B2 | 9/2017 | Vissamsetty et al. |
| 9,772,832 B2 | 9/2017 | Rubio |
| 9,781,148 B2 | 10/2017 | Mahaffey et al. |
| 9,807,092 B1 | 10/2017 | Gutzmann |
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,942,270 B2 | 4/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,237,282 B2 | 3/2019 | Nelson et al. |
| 10,250,636 B2 | 4/2019 | Vissamsetty et al. |
| 10,257,224 B2 | 4/2019 | Jaroch et al. |
| 10,284,591 B2 | 5/2019 | Giuliani et al. |
| 10,375,110 B2 | 8/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Vissamsetty et al. |
| 10,542,044 B2 | 1/2020 | Vissamsetty et al. |
| 10,567,431 B2 | 2/2020 | Vissamsetty et al. |
| 10,574,698 B1 | 2/2020 | Sharifi |
| 10,599,842 B2 | 3/2020 | Vissamsetty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 11,481,503 B2 | 10/2022 | Gitelman et al. |
| 11,507,663 B2 | 11/2022 | Cohen et al. |
| 11,522,894 B2 | 12/2022 | Weingarten et al. |
| 11,579,857 B2 | 2/2023 | Montag et al. |
| 11,580,218 B2 | 2/2023 | Salem et al. |
| 11,615,184 B2 | 3/2023 | Kutt et al. |
| 11,734,303 B2 | 8/2023 | Cruanes et al. |
| 11,888,897 B2 | 1/2024 | Vissamsetty et al. |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton, III et al. |
| 2003/0145226 A1 | 7/2003 | Bruton, III et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0160480 A1 | 7/2005 | Birt et al. |
| 2005/0193173 A1* | 9/2005 | Ring .................. G06F 21/57 |
| | | 714/E11.207 |
| 2005/0198507 A1 | 9/2005 | Brender et al. |
| 2005/0204157 A1 | 9/2005 | Johnson |
| 2005/0223239 A1 | 10/2005 | Dotan |
| 2005/0240906 A1 | 10/2005 | Kinderknecht et al. |
| 2005/0240989 A1 | 10/2005 | Kim et al. |
| 2005/0288939 A1 | 12/2005 | Peled et al. |
| 2006/0053490 A1 | 3/2006 | Herz et al. |
| 2006/0085543 A1 | 4/2006 | Hrastar |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos |
| 2007/0209070 A1 | 9/2007 | Yadav |
| 2007/0226320 A1* | 9/2007 | Hager .................. G06F 16/182 |
| | | 709/219 |
| 2007/0240215 A1 | 10/2007 | Flores et al. |
| 2007/0250930 A1 | 10/2007 | Aziz et al. |
| 2007/0266422 A1 | 11/2007 | Germano et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |

(56) References Cited

U.S. PATENT DOCUMENTS

| | | |
|---|---|---|
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2010/0332498 A1 | 12/2010 | Svore et al. |
| 2011/0023118 A1 | 1/2011 | Wright et al. |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheidt et al. |
| 2011/0185430 A1 | 7/2011 | Sallam |
| 2011/0209219 A1 | 8/2011 | Zeitlin et al. |
| 2011/0214176 A1 | 9/2011 | Burch et al. |
| 2011/0214182 A1 | 9/2011 | Adams et al. |
| 2011/0219443 A1 | 9/2011 | Hampel |
| 2011/0219449 A1 | 9/2011 | St. Neitzel |
| 2011/0225655 A1 | 9/2011 | Niemelä et al. |
| 2011/0247071 A1 | 10/2011 | Hooks et al. |
| 2011/0252434 A1 | 10/2011 | Stokes |
| 2011/0271341 A1 | 11/2011 | Satish et al. |
| 2011/0276597 A1 | 11/2011 | Little |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1* | 6/2012 | Sankruthi ............ H04L 63/1425 726/24 |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0254995 A1* | 10/2012 | Sallam ................... G06F 21/52 726/22 |
| 2012/0255003 A1 | 10/2012 | Sallam |
| 2012/0255004 A1 | 10/2012 | Sallam |
| 2012/0255012 A1* | 10/2012 | Sallam .................. G06F 21/554 726/23 |
| 2012/0291090 A1 | 11/2012 | Srinivasan et al. |
| 2012/0297486 A1 | 11/2012 | Turbin |
| 2012/0297488 A1 | 11/2012 | Kapoor et al. |
| 2012/0324094 A1 | 12/2012 | Wyatt et al. |
| 2012/0331553 A1* | 12/2012 | Aziz ..................... H04L 63/145 726/23 |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0198842 A1 | 8/2013 | Klein et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0239192 A1 | 9/2013 | Linga et al. |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0020046 A1 | 1/2014 | Heitzman |
| 2014/0046645 A1 | 2/2014 | White et al. |
| 2014/0053267 A1 | 2/2014 | Klein et al. |
| 2014/0059525 A1 | 2/2014 | Jawa et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0114609 A1 | 4/2014 | Maurer et al. |
| 2014/0123280 A1 | 5/2014 | Kedma |
| 2014/0137246 A1 | 5/2014 | Baluda |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0270157 A1 | 9/2014 | Youd et al. |
| 2014/0280864 A1 | 9/2014 | Yin et al. |
| 2014/0282816 A1 | 9/2014 | Xie et al. |
| 2014/0283038 A1 | 9/2014 | Call |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2014/0373091 A1 | 12/2014 | Kirner et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0067763 A1 | 3/2015 | Dalcher et al. |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala |
| 2015/0156214 A1 | 6/2015 | Kaminsky |
| 2015/0161024 A1 | 6/2015 | Gupta et al. |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0200955 A1 | 7/2015 | Martin |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |

(56) References Cited

U.S. PATENT DOCUMENTS

| | | |
|---|---|---|
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0268989 A1 | 9/2015 | Busch et al. |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1* | 11/2015 | Vissamsetty ........ H04L 63/1491 726/23 |
| 2015/0326592 A1 | 11/2015 | Vissamsetty et al. |
| 2015/0326599 A1 | 11/2015 | Vissamsetty et al. |
| 2015/0346066 A1 | 12/2015 | Dutta et al. |
| 2015/0350213 A1 | 12/2015 | Varadarajan et al. |
| 2015/0350236 A1 | 12/2015 | Klinghofer et al. |
| 2015/0358345 A1 | 12/2015 | Clark et al. |
| 2015/0370560 A1 | 12/2015 | Tan et al. |
| 2015/0373039 A1 | 12/2015 | Wang |
| 2015/0379371 A1 | 12/2015 | Yoon et al. |
| 2015/0381376 A1 | 12/2015 | Wardman et al. |
| 2016/0028750 A1 | 1/2016 | Di Pietro et al. |
| 2016/0042179 A1 | 2/2016 | Weingarten |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0065675 A1 | 3/2016 | Brand |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0335110 A1 | 11/2016 | Paithane et al. |
| 2016/0381023 A1 | 12/2016 | Dulce et al. |
| 2017/0009391 A1 | 1/2017 | Fu et al. |
| 2017/0019425 A1 | 1/2017 | Ettema et al. |
| 2017/0026387 A1 | 1/2017 | Vissamsetty et al. |
| 2017/0032122 A1* | 2/2017 | Thakar .................. G06F 21/566 |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1* | 5/2017 | Niemela ............... G06F 21/566 |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0201545 A1 | 7/2017 | Nicodemus et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao |
| 2017/0250855 A1 | 8/2017 | Patil et al. |
| 2017/0257375 A1 | 9/2017 | Dulkin et al. |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027009 A1 | 1/2018 | Santos et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0089431 A1 | 3/2018 | Nalluri et al. |
| 2018/0124096 A1 | 5/2018 | Schwartz et al. |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0191593 A1 | 7/2018 | De et al. |
| 2018/0225592 A1 | 8/2018 | Ponnuswamy |
| 2018/0248896 A1 | 8/2018 | Challita et al. |
| 2018/0359272 A1 | 12/2018 | Mizrachi et al. |
| 2018/0359278 A1 | 12/2018 | Rusakov et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0138639 A1 | 5/2019 | Pal et al. |
| 2019/0138725 A1 | 5/2019 | Gupta |
| 2019/0199736 A1 | 6/2019 | Howard et al. |
| 2019/0253453 A1 | 8/2019 | Vissamsetty et al. |
| 2019/0258807 A1 | 8/2019 | Dimaggio et al. |
| 2019/0294485 A1 | 9/2019 | Kukreja et al. |
| 2019/0294614 A1 | 9/2019 | Brodt et al. |
| 2019/0312904 A1 | 10/2019 | Stevens, IV et al. |
| 2019/0318100 A1 | 10/2019 | Bhatia et al. |
| 2019/0340353 A1 | 11/2019 | Mitelman |
| 2019/0349369 A1 | 11/2019 | Bengtson et al. |
| 2019/0354355 A1 | 11/2019 | Jacobson et al. |
| 2019/0379697 A1 | 12/2019 | Vissamsetty et al. |
| 2019/0392260 A1 | 12/2019 | Pang et al. |
| 2020/0050586 A1 | 2/2020 | Pal et al. |
| 2020/0051697 A1 | 2/2020 | Krishnamurti et al. |
| 2020/0076853 A1 | 3/2020 | Pandian et al. |
| 2020/0133865 A1 | 4/2020 | Mannava et al. |
| 2020/0143054 A1 | 5/2020 | Cohen et al. |
| 2020/0143061 A1 | 5/2020 | Kim et al. |
| 2020/0201620 A1 | 6/2020 | Beard |
| 2020/0218806 A1 | 7/2020 | Cho |
| 2020/0244677 A1 | 7/2020 | Abbaszadeh et al. |
| 2020/0252429 A1 | 8/2020 | Vissamsetty et al. |
| 2020/0274894 A1 | 8/2020 | Argoeti et al. |
| 2020/0374087 A1 | 11/2020 | Vissamsetty et al. |
| 2021/0029153 A1 | 1/2021 | Sugimoto et al. |
| 2021/0073374 A1 | 3/2021 | Mookken et al. |
| 2021/0073658 A1 | 3/2021 | Poole et al. |
| 2021/0117232 A1 | 4/2021 | Sriharsha et al. |
| 2021/0232291 A1 | 7/2021 | Abdulaal et al. |
| 2021/0263945 A1 | 8/2021 | Siebel et al. |
| 2021/0397710 A1 | 12/2021 | Cohen et al. |
| 2022/0050895 A1 | 2/2022 | Yu et al. |
| 2022/0070256 A1 | 3/2022 | Singh et al. |
| 2022/0086142 A1 | 3/2022 | Hecht |
| 2022/0101096 A1 | 3/2022 | Singer et al. |
| 2022/0164444 A1 | 5/2022 | Prudkovskij |
| 2022/0253526 A1 | 8/2022 | Sanders |
| 2022/0391496 A9 | 12/2022 | Salem et al. |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |

(56) References Cited

U.S. PATENT DOCUMENTS

| | | |
|---|---|---|
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |
| 2023/0247046 A1 | 8/2023 | Peters et al. |
| 2023/0247048 A1 | 8/2023 | Samosseiko et al. |
| 2023/0319089 A1 | 10/2023 | Chesla et al. |

FOREIGN PATENT DOCUMENTS

| | | |
|---|---|---|
| CN | 113297584 A | 8/2021 |
| CN | 113434858 A | 9/2021 |
| EP | 3 171 568 | 5/2017 |
| EP | 3472746 A1 | 4/2019 |
| EP | 3968197 A1 | 3/2022 |
| ES | 2785350 T3 | 10/2020 |
| JP | 2006-106939 A | 4/2006 |
| JP | 2008-252625 A | 10/2008 |
| JP | 2013-168141 A | 8/2013 |
| JP | 2015-534690 A | 12/2015 |
| JP | 2016-512631 | 4/2016 |
| JP | 2017-504102 | 2/2017 |
| KR | 10-2015-0101811 | 9/2015 |
| KR | 10-1969572 | 4/2019 |
| KR | 10-2021-0079494 A | 6/2021 |
| WO | WO 02/27440 A2 | 4/2002 |
| WO | WO 2010/030169 A2 | 3/2010 |
| WO | WO 2012/027669 | 3/2012 |
| WO | WO 2013/014672 | 1/2013 |
| WO | 2013/121951 A1 | 8/2013 |
| WO | WO 2015/171780 A1 | 11/2015 |
| WO | WO 2015/171789 A1 | 11/2015 |
| WO | WO 2016/024268 | 2/2016 |
| WO | WO 2016/081561 A1 | 5/2016 |
| WO | 2017/068889 A1 | 4/2017 |
| WO | WO 2017/064710 | 4/2017 |
| WO | 2017/218872 A1 | 12/2017 |
| WO | WO 2019/092530 | 5/2019 |
| WO | WO 2019/032728 | 3/2020 |
| WO | 2020/108357 A1 | 6/2020 |
| WO | 2022/076234 A1 | 4/2022 |

OTHER PUBLICATIONS

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

Installing a Tanium Client—distributed also using user/password (not encrypted) from a hosted Module server, downloaded from https://docs.tanium.com/client/client/deployment.html#client_management on Apr. 1, 2021.

IBM Software, "Stepping up the battle against advanced threats", IBM Trusteer Apex Thought Leadership White Paper, Dec. 2013, WGW03043-USEN-00.

IBM Security Qradar Solution Brief "Visibility, detection, investigation and response" printed from https://www.ibm.com/downloads/cas/OP62GKAR, printed on May 26, 2021, in 11 pgs.

"IBM Security Trusteer Apex Advanced Malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

IBM Guardium Documentation "Components and Topology", downloaded from https://www.ibm.com/docs/en/qsip/7.4?topic=deployment-qradar-architecture-overview, printed on Jun. 8, 2021, in 3 pages.

IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, pp. 855-860.

IBM, "Qradar Architecture overview", downloaded from https://www.ibm.com/docs/en/qsip/7.4?topic=deployment-qradar-architecture-overview printed May 28, 2021, in 6 pgs.

Moussaileb et al., "Ransomware's Early Mitigation Mechanisms," Proceedings ARES 2018Proceedings of the 13th International Conference on Availability, Reliability and Security Article No. 2, pp. 1-10 (2018).

Ornaghi et al., "Man in the middle attacks." Blackhat Conference Europe (2003).

Ramachandran et al., "Detecting ARP spoofing: An active technique." International Conference on Information Systems Security, Springer, Berlin, Heidelberg (2005).

Rüdiger Schollmeier, A Definition of Peer-to-Peer Networking for the Classification of Peer-to-PeerArchitectures and Applications, Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Tanium™ Client Management 1.6 User Guide, downloaded from https://docs.tanium.com/client_management/client_management/index.html on Apr. 1, 2021.

Xu, J-Y; Sung, A.H.; Chavez, P.; Mukkamala, S.; "Polymorphic Malicious Executable Scanner by APISequence Analysis", Fourth International Conference on Hybrid Intelligent Systems, IEEE Dec. 5-8, 2004, pp. 378-383.

Communication Pursuant to Article 94(3) EPC dated Dec. 11, 2018, for European Application 15 760 520.5, in 7 pages.

Extended European Search Report dated May 9, 2019, for Application No. 16855062.2, in 7 pages.

European Search Report dated Apr. 29, 2021, in European Patent Application No. 18844671 in 38 pages.

Extended European Search Report dated Jan. 25, 2021, for European Patent Application No. 20181537.0, in 10 pages.

Reaqta Hive, A.I. Based Endpoint Threat Response, Whitepaper, 27 pages (Apr. 6, 2017).

International Search Report and Written Opinion dated Feb. 18, 2016, for International Application No. PCT/IL2015/050802, in 10 pages.

International Preliminary Report on Patentability dated Feb. 14, 2017, for International Application No. PCT/IL2015/050802, in 7 pages.

International Search Report and Written Opinion dated Apr. 20, 2017, for International Application No. PCT/IL2016/051110, in 10 pages.

International Search Report and Written Opinion dated Dec. 11, 2018, for International Application No. PCT/US2018/045850, in 12 pages.

International Search Report and Written Opinion dated Aug. 24, 2020, for International Application No. PCT/US2020/033872, in 8 pages.

International Search Report issued in application No. PCT/US2021/050129 on Dec. 21, 2021.

International Search Report in corresponding International Patent Application No. PCT/US2015/29490, dated Aug. 7, 2015, in 2 pages.

Written Opinion in corresponding International Patent Application No. PCT/US2015/29490, dated Aug. 7, 2015, in 6 pages.

International Preliminary Report on Patentability in corresponding International Patent Application No. PCT/US2015/29490, dated Nov. 8, 2016, in 7 pages.

(56) References Cited

OTHER PUBLICATIONS

International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
Office Action dated Jul. 24, 2019, in European Patent Application No. 15760520.5, in 8 pages.
Office Action dated May 31, 2022, in Japanese Patent Application No. 2020-503272, in 7 pages.
Extended European Search Report dated Aug. 25, 2021, for European Patent Application No. 21162973.8, in 5 pages.
Notice of Allowance dated Jan. 30, 2024, in related U.S. Appl. No. 18/183,022, in 10 pages.
Office Action dated Aug. 1, 2023, in related U.S. Appl. No. 18/183,022, in 16 pages.
Bert Abrath • Bart Coppens • Stijn Volckaert • Bjorn De Sutter; Obfuscating Windows DLLs; 2015 IEEE/ACM 1st International Workshop on Software Protection (2015, pp. 24-30); (Year: 2015).
International Search Report and Written Opinion received for PCT Patent Application No. PCT/US24/44217, mailed on Jan. 15, 2025, 24 pages.
U.S. Appl. No. 61/989,965, filed May 7, 2014, "Distributed System for Bot Detection", 54 pages.
AEfficient Virus Detection Using Dynamic Instruction Sequencesa—May 2009 (Year: 2009).
IBM Security Guardium Insights for IBM Cloud Park for Security, printed from https://www.ibm.com/downloads/cas/QY1RYRLP, printed May 26, 2021 in 12 pages.
"IBM Security Qradar SIEM Installation Guide" downloaded from http://www.siem.su/docs/ibm/Installation_andupdating/IBM_SecurityQRadar installation_Guide.pdf, printed 2013, vol. 7.2 in 54 pages.
Abdelhameed, M.U, et al. Portable executable automatic protection using dynamic infection and code redirection; 2009 International Conference on Computer Engineering & Systems (pp. 501-507); (Year: 2009).
Abrath, Bert et al. Obfuscating Windows DLLs; 2015 IEEE/ACM 1st International Workshop on Software Protection (pp. 24-30); (Year: 2015).
Barbhuiya et al., "Detection of neighbor solicitation and advertisement spoofing in IPV6 neighbor discovery protocol." Proceedings of the 4th international conference on Security of information and networks. (2011).
Birrer, B, et al., "Using qualia and hierarchical models in malware detection", Journal of Information Assurance and Security, Dec. 29, 2009, pp. 247-255.
Chakraborty et al., "Hierarchical learning for automated malware classification", MILCOM 2017-2017 IEEE Military Communications Conference (MILCOM), Oct. 23-25, 2017, pp. 1-6.
Installing a Tanium Client—distributed also using user/password (not encrypted) from a hosted Module server, downloaded from https://docs.tanium.com/client/client/deployment.html#client_management on Apr. 2021.
Jack Ullrich, Detecting Manual Syscalls from User Mode, Winternl, Cybersecurity Research & Development, Feb. 10, 2021, 11 pages, https://winternl.com/detecting-manual-syscalls-from-user-mode/.
Mahler, "A New Methodology for Information Security Risk Assessment for Medical Devices and Its Evaluation," 2020, the Department of Software and Information Systems Engineering, Ben-Gurion University of the Negev, Israel.
Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).
Moussaileb et al., "Ransomware's Early Mitigation Mechanisms," Proceedings ARES 2018 Proceedings of the 13th International Conference on Availability, Reliability and Security Article No. 2, 02:S 1-10 (2018).
Nisslmueller, U., "LOLBin detection through unsupervised learning an approach based on explicit featurization of the command line and parent-child relationships", University of Twente, Student Theses, Sep. 27, 2022, 72 pages.
Pandian, "Security Challenges of IoT and Medical Devices in Healthcare," Internet of Things, 1st Edition, 2020, Chapter 6, pp. 87-106.
Shun-Wen Hsiao et al., "Sequence Feature Extraction for Malware Family Analysis via Graph Neural," Network, arXiv:2208.05476v1, Aug. 10, 2022, pp. 1-12.
Stine, "A cyber risk scoring system for medical devices," International Journal of Critical Infrastructure Protection, Dec. 2017, vol. 19, pp. 32-46.
Ullrich et al., "IPv6 Security: Attacks and Countermeasures in a Nutshell." 8th USENIX Workshop on Offensive Technologies (2015).
Zaldivar, "Investigating the Security Threats on Networked Medical Devices," 2020, 10th Annual Computing and Communication Workshop and Conference, Jan. 2020.

\* cited by examiner

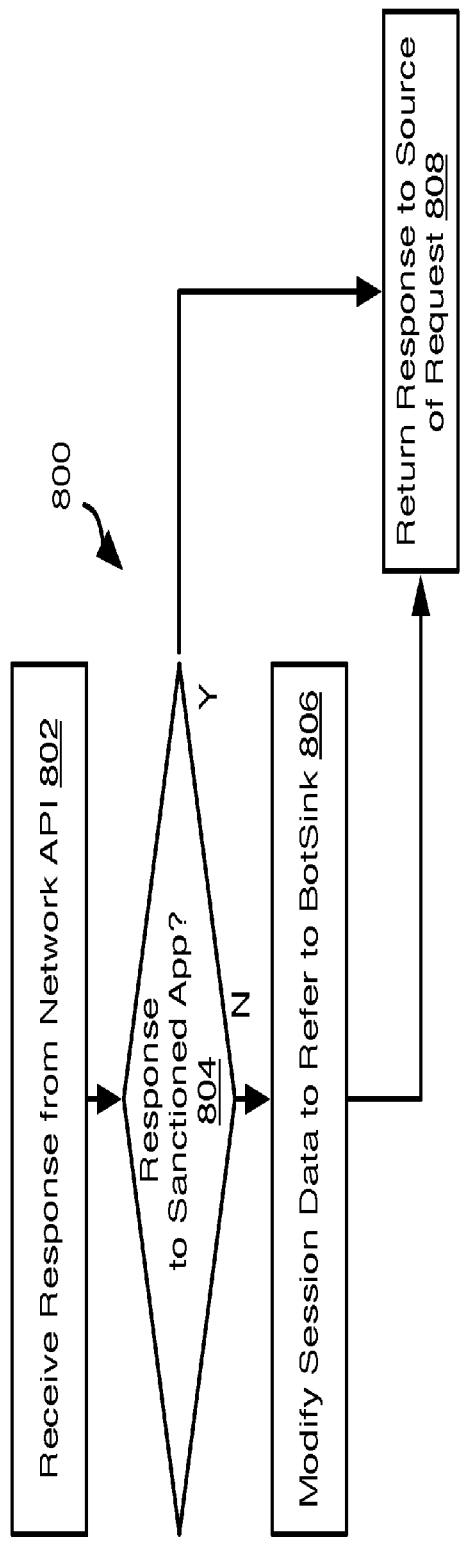

DECEIVING ATTACKERS ACCESSING NETWORK DATA

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

This application is a continuation of U.S. application Ser. No. 18/183,022, filed Mar. 13, 2023, and entitled "Deceiving Attackers Accessing Network Data", which is a continuation of U.S. application Ser. No. 16/849,813, filed Apr. 15, 2020, and entitled "Deceiving Attackers Accessing Network Data", which is a continuation-in-part of U.S. application Ser. No. 16/543,189, filed Aug. 16, 2019, and entitled "Deceiving Attackers Accessing Active Directory Data", which is hereby incorporated herein by reference in its entirety. U.S. patent application Ser. No. 16/543,189 is a continuation-in-part of U.S. application Ser. No. 15/383,522, filed Dec. 19, 2016, and entitled "Deceiving Attackers in Endpoint Systems", which is hereby incorporated herein by reference in its entirety for all purposes.

BACKGROUND

Once an end point system is compromised, attackers try to move laterally in the network. Attackers harvest data from end point systems and then use that information to move laterally. The systems and methods disclosed herein provide an improved approach for preventing unauthorized access to application data on endpoint systems.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 8 is a process flow diagram of a method for preventing unauthorized access to domain data in accordance with an embodiment of the present invention;

DETAILED DESCRIPTION

Figure 1:
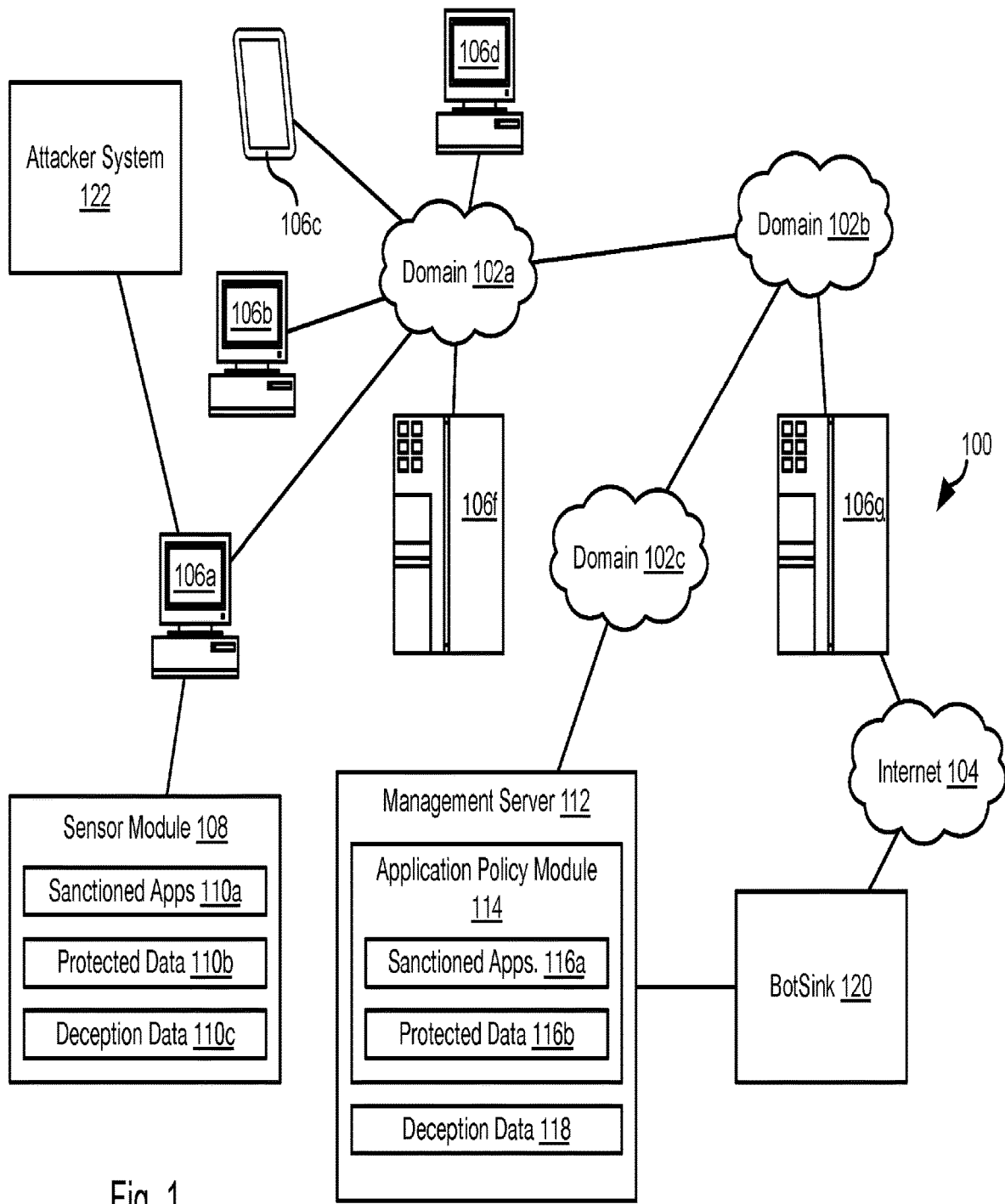
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written m any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed herein may be practiced in a network environment 100 including a plurality of domains 102a-102c. The domains 102a-102c may be any network division, such as a subnet, local area network (LAN), virtual local area network (VLAN), or the like. The domains 102a-102c may be distributed within a same building or over a large geographic area with interconnecting links including the Internet 104. The illustrated domains 102a-102c may represent one or more network components, such as routers, switches, servers, and the like that implement routing of traffic within the domains 102a-102c and control traffic flowing into and out of the domains 102a-102c.

Each domain may include one or more endpoints 106a-106g. The endpoints 106a-106g are production computing devices that operate as personal computers for users or servers providing production services to other endpoints or to external computers accessing the network environment by way of the internet 104. The endpoints 106a-106g may be desktop or laptop computers, mobile phones, tablet computers, server computers, and any other type of computing device. Some endpoints 106a-106g may include internet-enabled devices, i.e. so-called internet of things (IoT) devices that are often a vulnerability.

The endpoints 106a-106g are not dedicated honeypots, but rather perform non-decoy functions and process legitimate production data and legitimate production tasks of an enterprise, such as functioning as user computers executing applications such as word processors, browsers, graphics programs etc. The endpoints 106a-106g may also function as web servers, database servers, remote login servers, application servers, and the like.

Some or all of the endpoints 106a-106g execute a sensor module 108. The sensor module 108 stores or accesses a list of sanctioned applications 110a and may also store or access a listing or description of protected data 110b. The endpoints 106a-106g may execute one or more instances of one or more of the sanctioned applications 110a and store data generated or used by these applications that corresponds to the protected data. The sanctioned applications 110a are production applications for performing any of the production tasks and functionality mentioned above. Accordingly, the protected data 110b may also be production data for use in performing the production tasks and functionality mentioned above, as opposed to decoy or deceptive data.

The sensor module 108 may store or access deception data 110c stored locally on the endpoint 106a-106g or accessed from another location. The deception data 110c may mimic the format of production data in the form of web pages, word processor documents, spreadsheets, databases, etc. The deception data 110c may also mimic other files used by applications such as credentials for authenticating the application with a remote server, configuration files, browser histories, a listing of recently accessed files, configuration files, and the like.

In the case of credentials or other files that are used to access a remote server or provide a record of accessing a remote server, the deception data 110c may reference a BotSink 120. The BotSink 120 may function as a honey pot programmed to engage an attacker while preventing access to production data or computer systems. For example, the BotSink 120 may execute one or more virtual machines implementing network services that engage and monitor malicious code while preventing access to other endpoints 106a-106g of the network. The BotSink 120 may implement any of the method methods for detecting and engaging malicious code disclosed in the following applications (herein after "the incorporated applications"), which are hereby incorporated herein by reference in their entirety:

U.S. application Ser. No. 14/458,026, filed Aug. 12, 2014, and entitled DISTRIBUTED SYSTEM FOR BOT DETECTION;

U.S. application Ser. No. 14/466,646, filed Aug. 22, 2014, and entitled EVALUATING URLS FOR MALICIOUS CONTENT;

U.S. application Ser. No. 14/549,112, filed Nov. 20, 2014, and entitled METHOD FOR DIRECTING MALICIOUS ACTIVITY TO A MONITORING SYSTEM;

U.S. application Ser. No. 15/157,082, filed May 17, 2016, and entitled EMULATING SUCCESSFUL SHELLCODE ATTACKS;

U.S. application Ser. No. 14/805,202, filed Jul. 21, 2015, and entitled MONITORING ACCESS OF NETWORK DARKSPACE;

U.S. application Ser. No. 14/965,574, filed Dec. 10, 2015, and entitled DATABASE DECEPTION IN DIRECTORY SERVICES;

U.S. application Ser. No. 15/142,860, filed Apr. 29, 2016, and entitled AUTHENTICATION INCIDENT DETECTION AND MANAGEMENT;

U.S. application Ser. No. 15/153,471, filed May 12, 2016, and entitled LURING ATTACKERS TOWARDS DECEPTION SERVERS;

U.S. application Ser. No. 15/204,779, filed Jul. 7, 2016, and entitled DETECTING MAN-IN-THE-MIDDLE ATTACKS; and U.S. Application Ser. No. 15/360,117, filed Nov. 23, 2016, and entitled IMPLEMENTING DECOYS IN NETWORK ENDPOINTS.

In some embodiments, the data 110a-110c is provided to the endpoints 106a-106g by a management server 112. The management server 112 may implement an application policy module 114. The application policy module 114 stores or accesses a listing 116a of sanctioned applications and may provide an interface for an administrator to specific what applications are included in the listing 116a. The listing 116a may indicate which applications are sanctioned for particular endpoints 106a-106g or for endpoints in a particular domain 102a-102c. The listing 116a may be automatically updated to include applications as they are installed on endpoints 106a-106g by an administrator.

In a similar manner, the management server 112 may store or access protected data 116b that lists data files, folders, or other descriptors of data that are protected. The protected data 116b may be obtained automatically from configuration files for applications. For example, an application on installation will often create directories for files used by the application. Accordingly, these directories and files may be observed by analyzing the configuration files for instructions to create these directories and files or by observing how the file system changes following installation of the application on a sample endpoint.

The management server 112 may also store or access deception data 118. As noted above, this deception data may mimic production data for one or more applications and may reference the BotSink 120 in order to lure attackers into engagement with the BotSink 120.

The management server 112 distributes some or all of the data 116a-116b, 118 to the endpoints 106a-106g. For example, deception data 118 provided to an endpoint may mimic files generated or used by one or more production applications actually installed on that endpoint. Likewise, the listing of sanctioned applications 116a provide to the endpoint may include only those applications that were installed by an administrator or authorized user on that endpoint. The deception data 118 provided to the endpoint may then include deception data mimicking the production data of those applications. The management server 112 may periodically update the data 116a-116b, 118 and distribute updated data to the endpoints 106a-106g.

The methods disclosed herein are invoked in response to an attacker system 122 attempting to access production application data on an endpoint 106a-106g. This may include the attacker system 122 issuing commands to the endpoint 106a-106g or uploading malicious code to the endpoint 106a-106g, which then attempts to access the production application data. However, unauthorized access may be prevented using the methods disclosed herein in either case.

Figure 2:
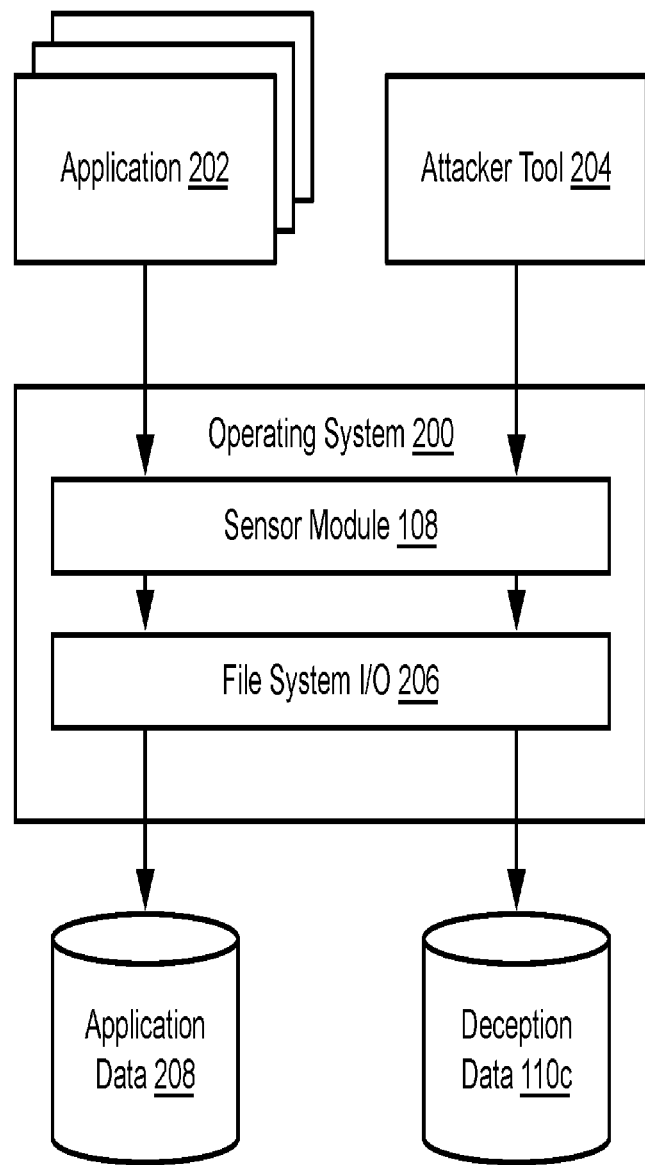
FIG. 2 is a diagram illustrating components for preventing unauthorized access to application data in accordance with an embodiment of the present invention.

Referring to FIG. 2, the sensor module 108 may be incorporated into the operating system 200, such as by modifying the functions of one or more libraries for performing access to a file system. The sensor module 108 intercepts file system command from instances of applications 202 installed on the endpoint as well as file system commands from an attacker, such as an attacker tool 204 executing on the endpoint. The file system commands that are intercepted may include write commands, read commands, delete comments, or instructions to list the contents of a directory or other commands to navigate through a directory.

The sensor module 108 evaluates a source of each command, e.g. the binary instance executing on the endpoint that issued the command to the operating system. If the source of the command is an application listed in the sanctioned applications 110a, the command is passed to the file system I/O (input output) functions 206 of the operating system 200, which then executes the command with respect to the production application data 208.

If the source of the command is not found to be in the sanctioned applications 110a, the command may be modified such that it refers to deception data 110c. The modified command may then be input to the file system I/O functions 206. In the case of a write or delete command, the sensor module 108 may suppress execution of the command and return an acknowledgment to the source of the command indicating that the command was executed successfully.

In the embodiment of FIG. 2, the modified commands are executed by the same file system I/O functions 206 as other commands. Accordingly, the deception data 110c may be stored in the file system and accessible to such functions 206. However, the deception data 110c may be hidden such that it is not viewable by users or applications executing on the endpoint.

In other embodiments, the sensor module 108 itself may access and return the deception data 110c, in which case the deception data 110c may be stored anywhere, including remotely from the endpoint and referenced by the sensor module 108. The deception data 110c could, for example, be encrypted such that only the sensor module 108 can decrypt the deception data 110c in order to return it in response to a read command from the attacker tool 204 or other unauthorized source.

In still other embodiments, the sensor module 108 may automatically generate deception data 110c in response to file system commands, such as based on templates that are populated with random data in order to mimic a type of file requested by the file system command from the attacker tool 204.

Figure 3A:
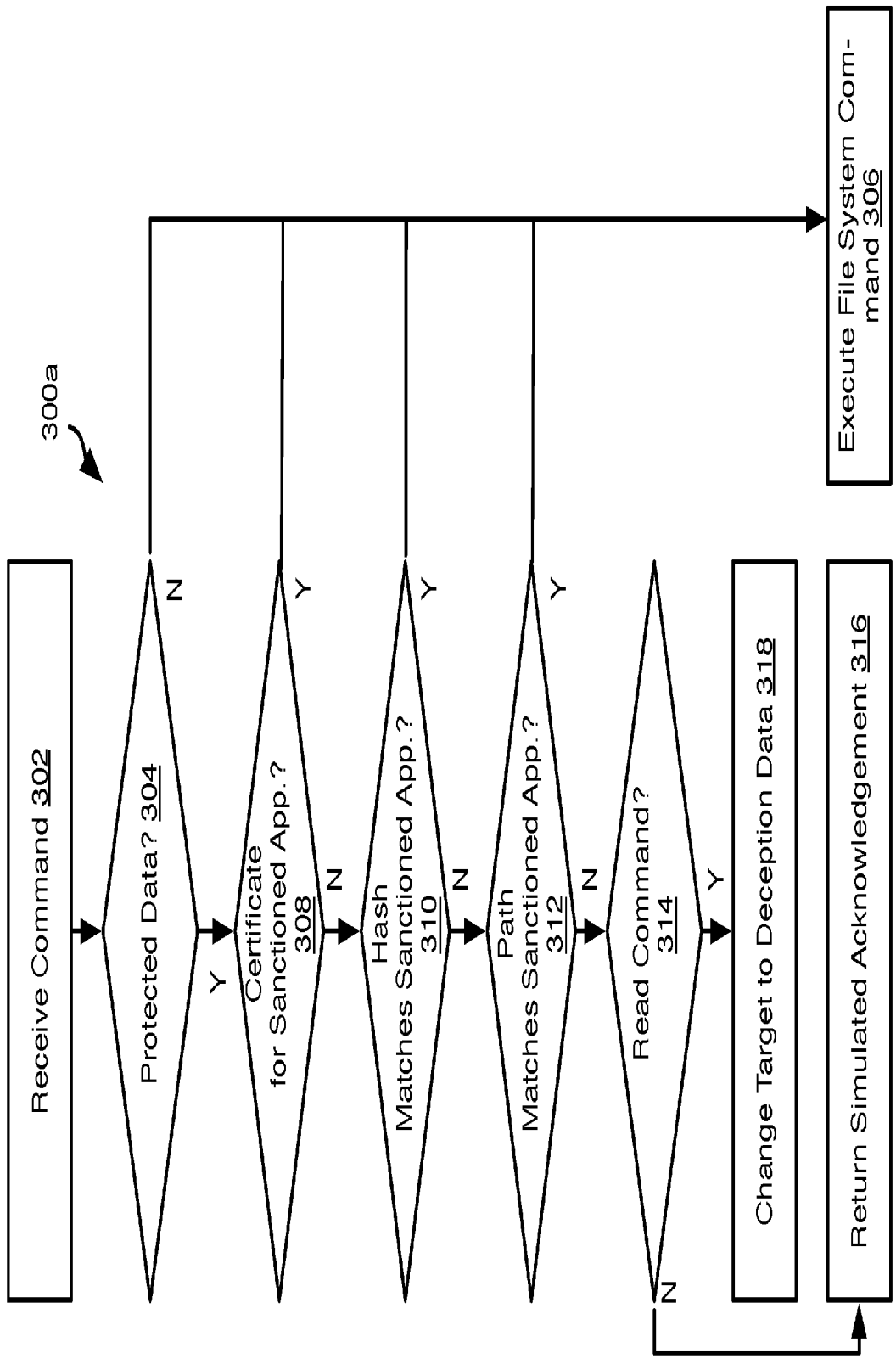
FIGS. 3A and 3B are process flow diagrams of methods for preventing unauthorized access in accordance with an embodiment of the present invention.

Referring to FIG. 3A, the sensor module 108 may include any executable code programmed to execute the illustrated method 300a. The method 300a may include receiving 302 a file system command, such as by intercepting a command made to the operating system 200 of the endpoint in which the sensor module 108 is embedded.

The method 300a may include evaluating 304 whether the data (file, directory, type of file, etc.) is protected data, such as might be indicated by the listing 110b of protected data on the endpoint. If not, the method 300a may include executing 306 the file system command without modification, i.e. passing it to the operating system 200 for execution. In some embodiments, only the sanctioned applications 110a are permitted to issue file system commands, which may include operating system utilities. Accordingly, in some embodiments, step 304 may be omitted.

The method 300a may further include evaluating a source of the file system command according to some or all of steps 308-312. For example, if the source of the file system command is found 308 to have a certificate matching that of a sanctioned application 110a, then file system command may be executed 306 with respect to the data referenced in the command.

If a hash, e.g. the SHA-1 (secure hash algorithm) hash of the binary code that issued the file system command is found 310 to match a hash of the binary executable for one of the sanctioned applications 110a, then the file system command may be executed 306 with respect to the data referenced in the command.

If a path to the binary code that issued the file system command is found 312 to match the path to the binary executable of one of the sanctioned applications 110a, then the file system command may be executed 306 with respect to the data referenced in the command.

Steps 308-312 are just examples of checks that may be used to verify whether binary code issuing a command is in fact an instance of a sanctioned application. In some embodiments, all of steps 308-312 must be satisfied before step 306 will be executed with respect to the data referenced in the command. In other embodiments, other checks may be used as alternatives or as additional requirements before step 306 will be executed with respect to the data referenced in the command.

In some embodiments, certain protected data may be bound to a particular sanctioned application 110a. Accordingly steps 308-312 may be evaluated only for those applications that are bound to the protected data 110b referenced in the file system command, i.e. the command will be executed with respect to the data referenced in the command only if one of 308-312 (or each and every one of 308-312 in some embodiments) is satisfied for at least one sanctioned application 110a that is also bound to the protected data 110b referenced in the file system command.

If the tests of steps 308-312 are not sufficient to invoke execution of step 306 for the data referenced in the file system command according to any of the embodiments mentioned above, then the source of the file system command may be determined not to be one of the sanctioned applications 110a and processing continues at steps 314, 318.

If the file system command is found 314 to be a read comment, then file system command may be changed 318 to refer to the deception data 110c of the endpoint. Step 306 may be executed with respect to the modified file system command, which will include returning the deception data referenced by the modified file to the source of the file system command, such as to the attacker tool 204.

If the file system command is found 316 not to be a read command, such as in the case of a write or a delete command, then the file system command is ignored and a simulated acknowledgment of the command is returned 316 to the source of the file system command.

Figure 3B:
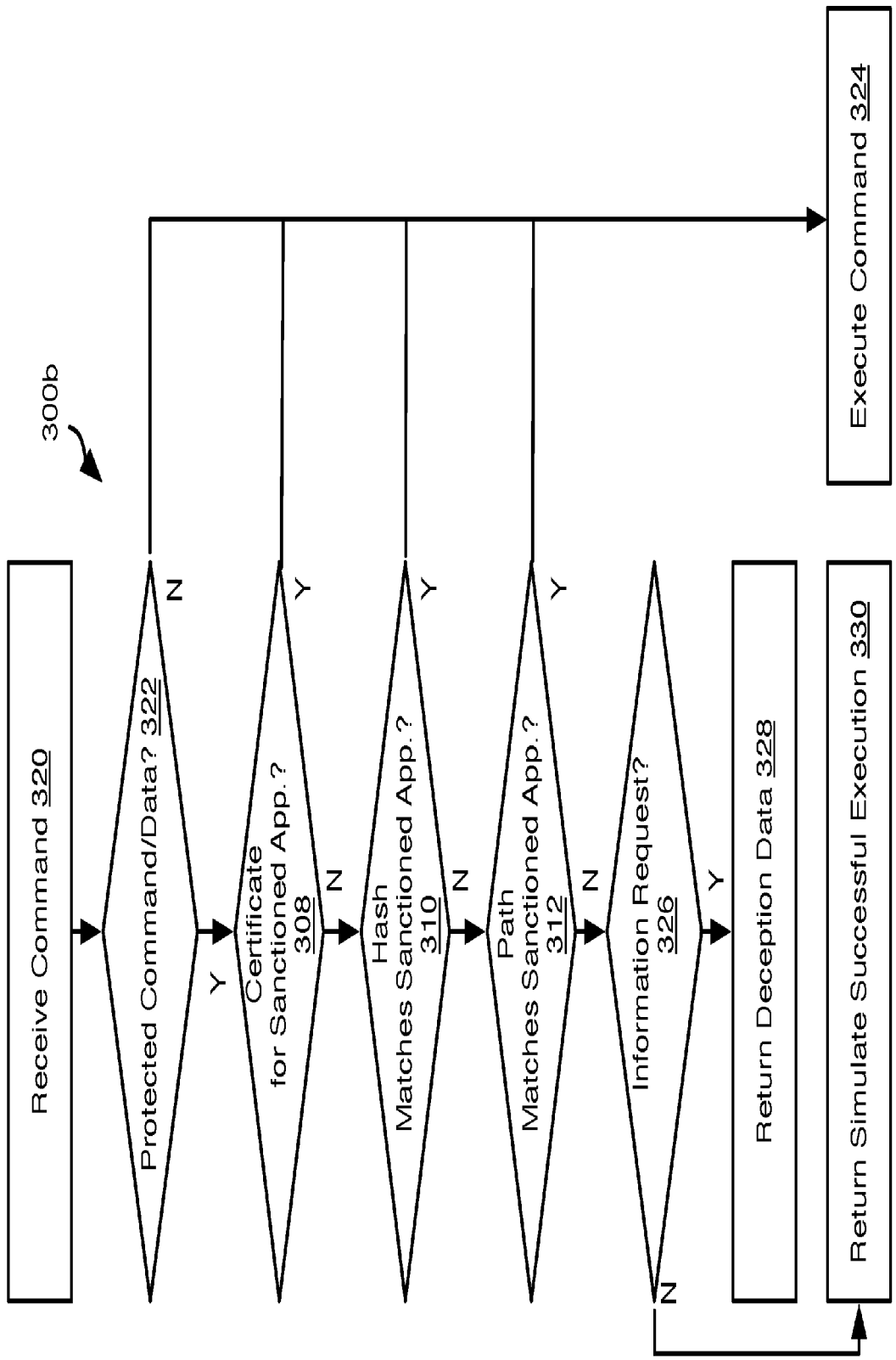

Referring to FIG. 3B, in some embodiments, the sensor module 108, or a different sensor module 108 may execute the illustrated method 300b with respect to commands other than file system commands. In some embodiments, a plurality of sensor modules 108 execute on the endpoint and each sensor module 108 may intercept a different types of command. Each sensor module will then execute the method 300a or 300b upon intercepting that type of command. For example, requests to modify, delete, or read information regarding processes executing on the endpoint, the registry of the endpoint, or an application programming interface (API) available to applications executing on the endpoint. The method 300b may include receiving 320 a command and evaluating 322 whether the command references protected data or is a protected command. If not, then the command may be executed 324. For example, the protected data 110b may indicate which commands are restricted to sanctioned applications 110a in addition to data or types of data that are protected. In some embodiments, only sanctioned applications are permitted to access any data or invoke execution of any command. Accordingly, step 322 may be omitted as a path to execution 324 of a command.

The method 300b may further include evaluating the source of the command of step 320 according to steps 308-312 in the same manner as for the method 300a. If the conditions of steps 308-312 are met, then the command may be executed in the same form it was received. As for the method 300a, all of steps 308-312 must have a positive result before the command is executed 324 and one or more additional tests may be required to be satisfied before the command is executed 324 without modification.

If the steps 308-312 indicate that the source is a sanctioned application, then the method 300b may include evaluating 326 whether the command is a request for information, such as a request for information regarding executing processes, the registry, available APIs, or other system information. If so, then deception data is returned 328 to the source of the command. As for other embodiments disclosed herein, the deception data that is returned may mimic the legitimate data that is requested but not correspond to actual system data.

If the command is not a request for information, the method 300b may include returning 330 a result that simulates successful execution of the command. As for the method 300a, a delete command may indicate that data was successfully deleted, a modify command may indicate that the system data or process or operating parameter referenced in the command was modified as requested.

An example of the use of the method 300a may include the browser history for a browser. For example, the FIREFOX browser history may be stored at C: \Users\<user name>\AppData\Roaming\Mozilla Firefox\Profiles\<some profile number>.default\formhistory.sqlite. Ordinarily, only the FIREFOX browser should access this file inasmuch as it will include functions for displaying the browser history on request. Accordingly, any other application attempting to access this file or its directory may be blocked by the sensor module I 08 and instead receive a simulated browser history file including decoy data.

In another example, in Windows, the "shawdowcopy delete" command deletes the volume shadow copies. Malware often deletes this to accessing of backup volumes. Accordingly, this file may be listed as protected data 110b and sensor module 108 will detect attempts to delete the volume shadow copies by non-sanctioned applications and prevent their execution. As noted above, acknowledgments of such commands may be returned indicating that the volume shadow copies were in fact deleted.

In an example of the use of the method 30b, an attacker, e.g. attacker tool 122, tries to access the registry, which may be in a listing of protected data 110b. For example, the attacker may attempt to read the registry to determine a registry key for one or more antivirus application (e.g., MCAFEE, SYMANTEC, or the like) is present in the registry. No legitimate application would generally need to access the registry to determine whether an antivirus application is installed. In some embodiments, the sensor module 108 may intercept such attempts and return a result including a registry key for the antivirus tool, regardless of whether the antivirus application is installed. In many cases, this will cause the attacker tool to refrain from installing itself or otherwise attempting to perform malicious activities.

In another example, the attacker, e.g. attacker tool 122, seeks to determine whether the endpoint is a virtual machine (VM), such as by evaluating the registry to determine whether a hypervisor is installed and/or executing on the endpoint. The sensor module 108 intercepts these requests and returns an output indicating that the endpoint is executing a VM, e.g. indicate that the current operating environment in which the command was received is a VM or that a hypervisor is installed and/or executing on the endpoint. In another example, the attacker, e.g. attacker tool 122, seeks to view a list of processes executing on the endpoint. In response, the sensor module 108 will return a "correct list of processes list" to the attacker.

Figure 4:
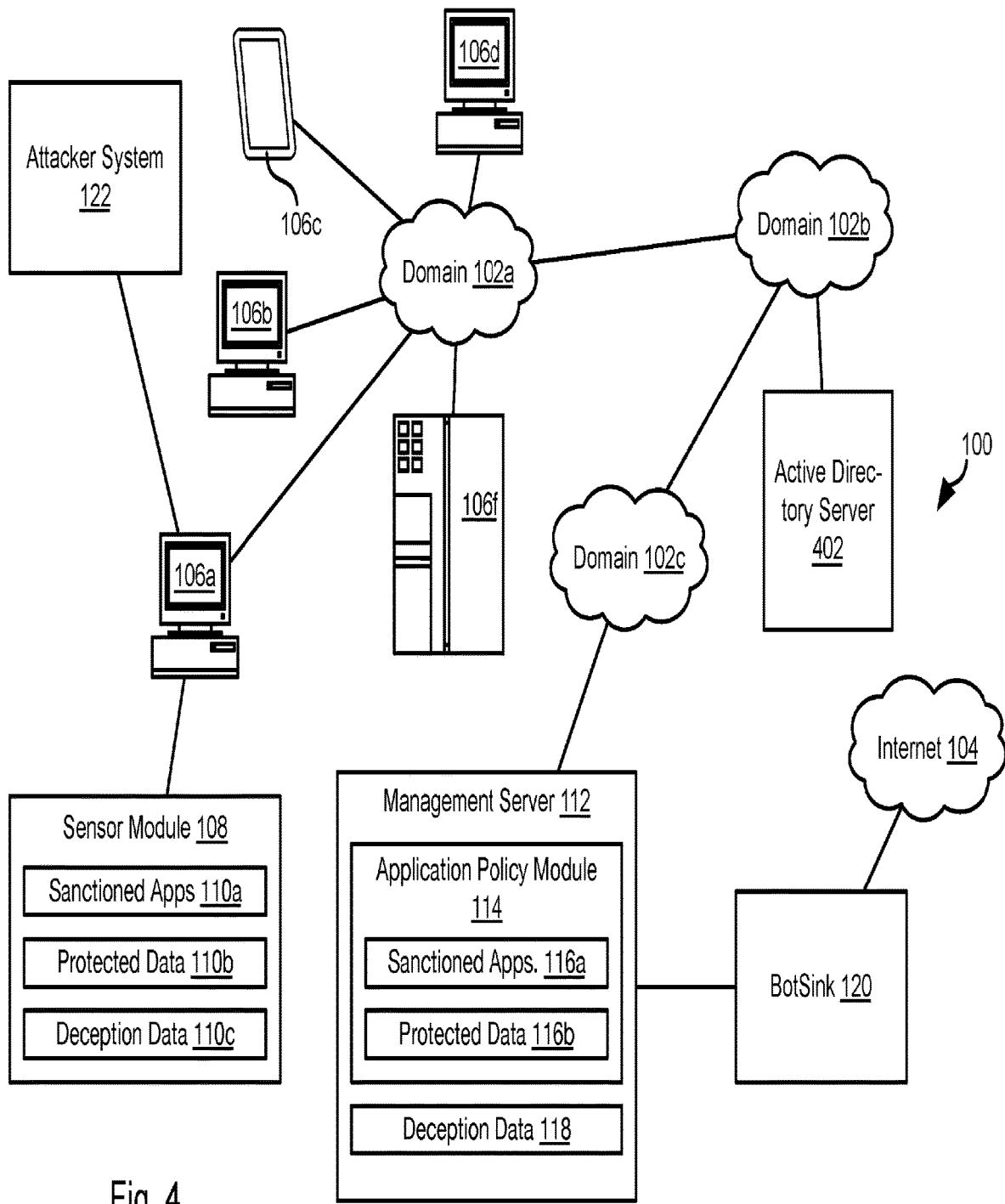
FIG. 4 is a schematic block diagram of an alternative network environment for performing methods in accordance with an embodiment of the present invention.

Referring to FIG. 4, the network environment 100 may further include an active directory server 402 in one or more of the domains I 02a-102c. The active directory server 402 may implement a directory service. A directory service functions as databases that map and store the names of network resources to their respective network addresses. Users referencing network objects need not remember the physical address of the object. The directory may store network resources and those resources may or may not have a name. The directory can also store user identifiers (very common), departments of user identifiers, access level of user identifiers, hosts accessible by user identifiers, the access level associated with each user identifier. The directory may further store organizational details, a network topology, an IT policy, and the like. Although Active Directory, the most popular directory server, depends on DNS very heavily, it is distinct therefrom and provides much more than a simple mapping between domain names and IP addresses. In particular, directory services may perform authentication for access to resources as well. LDAP (Lightweight Directory Access Protocol) is one of the popular methods available to access the data in directory services. LDAP also provides authentication and authorization to let user access resources in directory services.

The directory service implemented by the active directory server 402 may provide authorization and access to key assets in corporate networks. Attackers may use various methods of exploitation to get unauthorized access to directory services. Once an attacker obtains access to a directory service, the attacker can easily log into key servers, databases etc. by impersonating credentials stored in directory services. The attacker may then exfiltrate data. For example, confidential data may be disclosed. In some instances, unauthorized modifications could be made (such as new account creation, access control modifications, document forgery, backup corruption, unauthorized financial transactions etc.) or data may be made unavailable (such as crypto malware, bank account takeover, bringing down or defacement of corporate web servers).

The systems and methods disclosed herein incorporate database deception into directory services so that attackers cannot differentiate between real production assets with respect to fake assets. Once an attacker access fake credentials pointing to a BotSink 120, the system prevents outbound access and simulates access to actual enterprise assets. This enables the identification and analysis of attackers for use in preventing data breaches.

"Active Directory" (AD) is one of the directory services supported by WINDOWS operating systems. The AD domain controller is a server that provides authentication services within a domain whereby it provides access to computer resources. AD provides a database storing information about objects. Each object can be a user, computer, or a group of users. Although the systems and methods disclosed herein are described for use with an Active Directory system, they may be applied with equal effectiveness to any directory service.

The systems and methods described herein returns simulated responses to requests to an active directory server 402. These responses reference the BotSink 120 and may include credentials for authenticating with respect to the BotSink 120, such as a user account defined on the BotSink 120 or a service executing on the BotSink 120. These responses lure an attacker to use the service or to attempt to use the user account. However, use of such services or accounts results in engagement of the attacker with the BotSink 120 and other resources described herein. This enables early detection of malicious intent and account misuse and diverts attention from real targets and resources.

Figure 5:
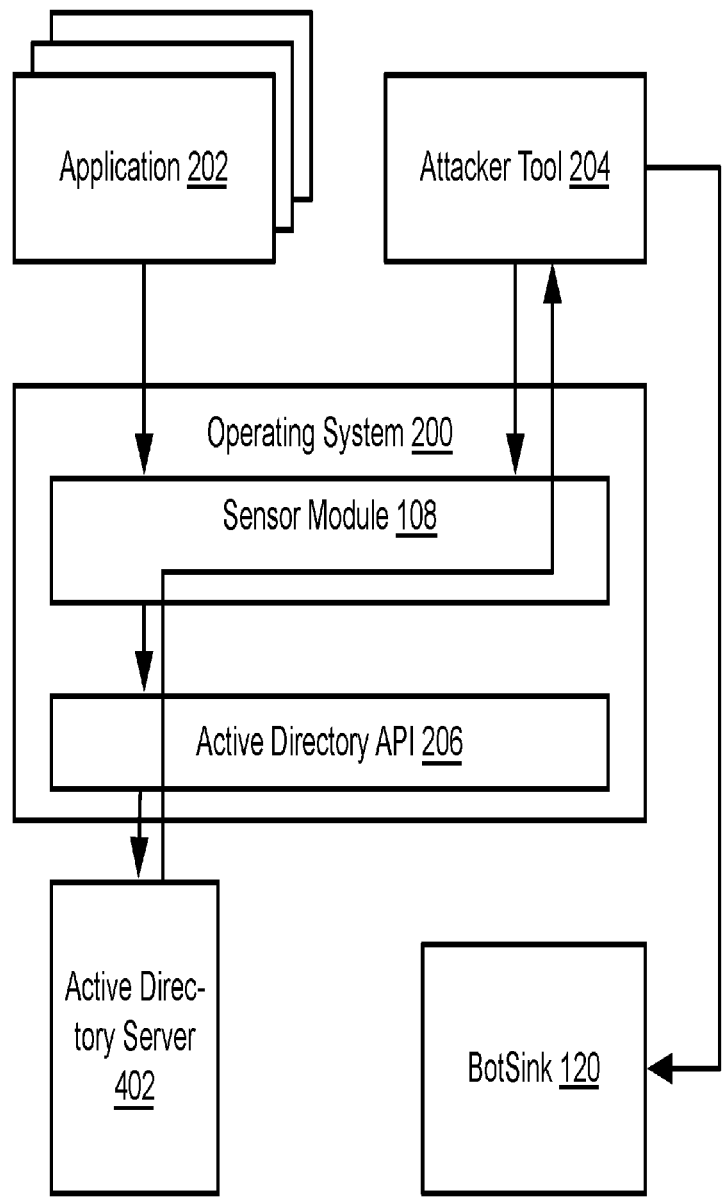
FIG. 5 is a diagram illustrating components for preventing unauthorized access to active directory data in accordance with an embodiment of the present invention.

Referring to FIG. 5, in some embodiments, the sensor module 108 on an endpoint 106a-106g may detect responses from an active directory server 402. These responses may be the result of requests issued to the active directory server 402 by an application 202 or attacker tool 204 executing on that endpoint 106a-106g. For example, the sensor module 108 may operate in conjunction with substituted or modified functions in an active directory API (application programming interface) in the operating system 200 of an endpoint 106a-106g. The substituted or modified functions may route responses from the active directory server 402 to the sensor module 108 prior to return of the response to the application that requested it. The sensor module 108 may then determine whether to return the response to an application 202 to which the response is addressed without modification or with modification. In particular, if the response is addressed to an attacker tool 204 that is not a sanctioned application, the response may be modified such that any system, user account, or credential included in the response is replaced with corresponding references to the BotSink 120, decoy computer on the BotSink 120, a credential or user account for authenticating with the BotSink 120 (e.g., logging in, accessing a particular service, etc.).

The manner in which the application to which the response is addressed is determined to be sanctioned or not may be according to the approach described in either of FIGS. 3A and 3B. In particular, the response from the active directory server 402 may be received on a port with respect to which an application is registered by the operating system 200. Accordingly, the sensor module 108 may evaluate that application to determine whether it is sanctioned according to the approach of either of FIGS. 3A and 3B. If not, the response is modified at step 606 to replace references to addresses, actual user accounts, services, computer systems, or other production resources with corresponding references to the BotSink 120, i.e. an address of the BotSink 120, a decoy user account, decoy service, decoy virtual machine, or other decoy resource executing on the BotSink 120.

Figure 6:
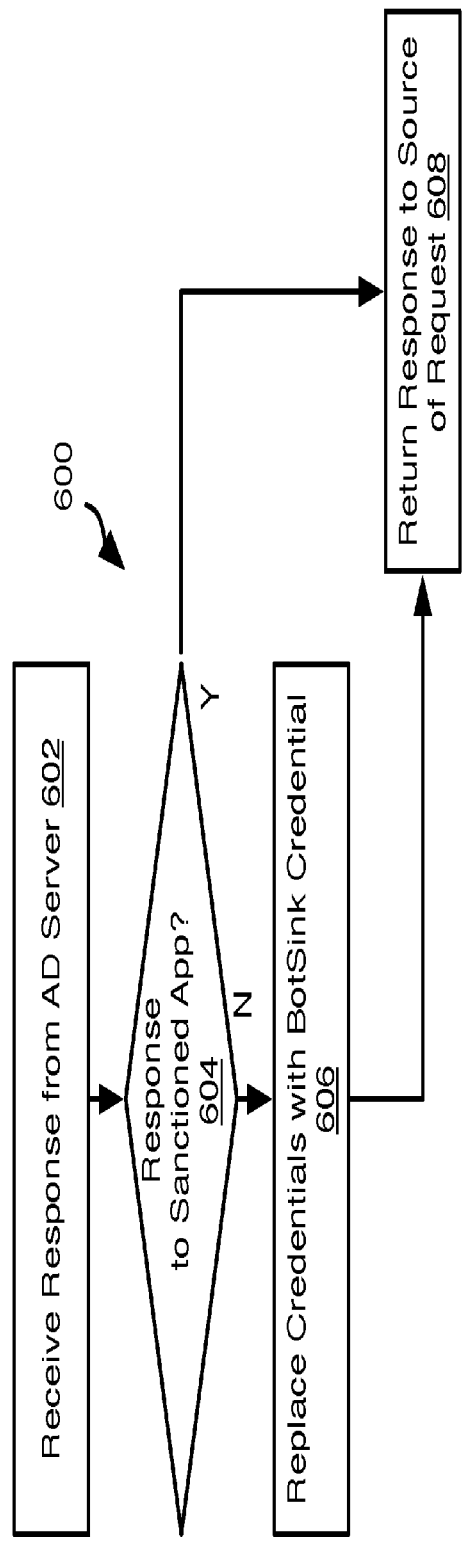
FIG. 6 is a process flow diagram of a method for preventing unauthorized access to active directory data in accordance with an embodiment of the present invention.

Referring to FIG. 6, the sensor module 108 may execute the illustrated method 600 with respect to responses from the active directory server 402. The method 600 includes receiving 602 a response from the active directory server 402 by the sensor module 108. The sensor module 108 evaluates 604 whether the application to which the response is addressed is sanctioned. For example, this may include evaluating an application listening to a port to which the response was addressed. Alternatively, the response may include some other identifier that is sufficient to identify the application (i.e. instance of an application executing on operating system 200 to which the response is addressed. As noted above, receiving the response may be performed by interfacing with an API programmed to interface with the active directory server 402 such that response are intercepted before they are returned to the requesting application. For example, the sensor module 108 may interface with substituted or modified versions of the Power Shell such that commands input to the Power Shell are intercepted and possibly modified by the sensor module 108. Commands that may be intercepted may include commands such as 'net group/domain "domain users"' will return list of domain users present in Active Directory. Other example commands include 'Get-ADComputer-Filter*' will return all computer accounts in Active Directory, "nltest/dclist: domain name" will return domains in the network.

The modified response is then returned 608 to the application to which it is addressed, i.e. the application that requested the information included in the response from the active directory server 402. Where the application is found 604 to be sanctioned, the original response, or data from the response, is returned 608 to the source of the request without substituting references to the BotSink 120.

Note that FIG. 6 illustrates the case where a response from the active directory service is received and modified. In other embodiments, a request from an application that is not sanctioned that is addressed to the active directory service is intercepted and simulated response is generated that references the BotSink 120, i.e. a response that has an expected format corresponding to the request but with names of systems, addresses, credentials, services, etc. referencing such entities as implemented by the BotSink 120.

In some embodiments, the active directory server 402 may host decoy information describing a configuration of the BotSink 120, such as decoy information describing decoy users accounts, addresses of decoy systems (virtual machines), decoy services, and decoy credentials for accessing any of these accounts, systems, and services. Accordingly, modifying a request by the sensor module may include modifying the request such that it is a request for decoy information on the active directory server (e.g., references the BotSink 120) such that the response from the active directory server 402 includes only the decoy information rather than the information actually requested.

In some embodiments, authenticated users of an endpoint 106a-106g are added to a whitelist accessed by the sensor module 108 such that requests to the active directory server 402 and responses received are not substituted according to the method 600.

Figure 7:
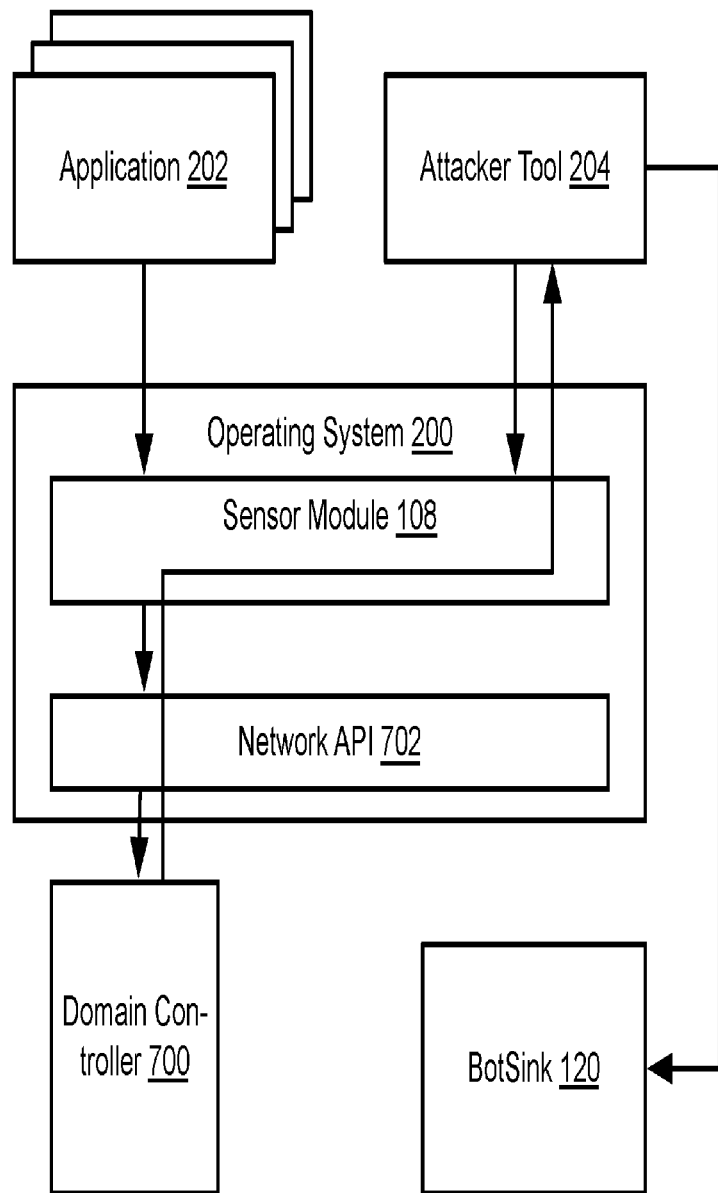
FIG. 7 is a diagram illustrating components for preventing unauthorized access to domain data in accordance with an embodiment of the present invention.

Referring to FIG. 7, in some embodiments, the sensor module 108 intercepts responses to requests to a domain controller 700. In some embodiments, the function of the domain controller 700 is performed by a domain joined computer. For example, the sensor module 108 may monitor one or both of requests to a network API 702 of the operating system 200 to the domain controller 700 and responses to such requests.

For example, referring to the method 800 of FIG. 8, the responses may be responses to requests for session data issued received 802 from a network API 702. A response determined 804 to be to a non-sanctioned application may be modified at step 806 to refer to the BotSink 120 and returned 808 to the non-sanctioned application. In one scenario, an attacker tool 204 executing on an infected endpoint (e.g., endpoint 106a) requests session data from the domain controller 700 or domain joined computer 700 using information learned via earlier active directory queries.

Responses determined 804 to be in response to requests from sanctioned applications 202 may be returned 808 to them without replacing a reference to a computer system in the response with a reference to the BotSink 120. The manner in which an application is determined 804 to be sanctioned may be performed in the same manner described above with respect to either of FIGS. 3A and 3B.

Figure 9A:
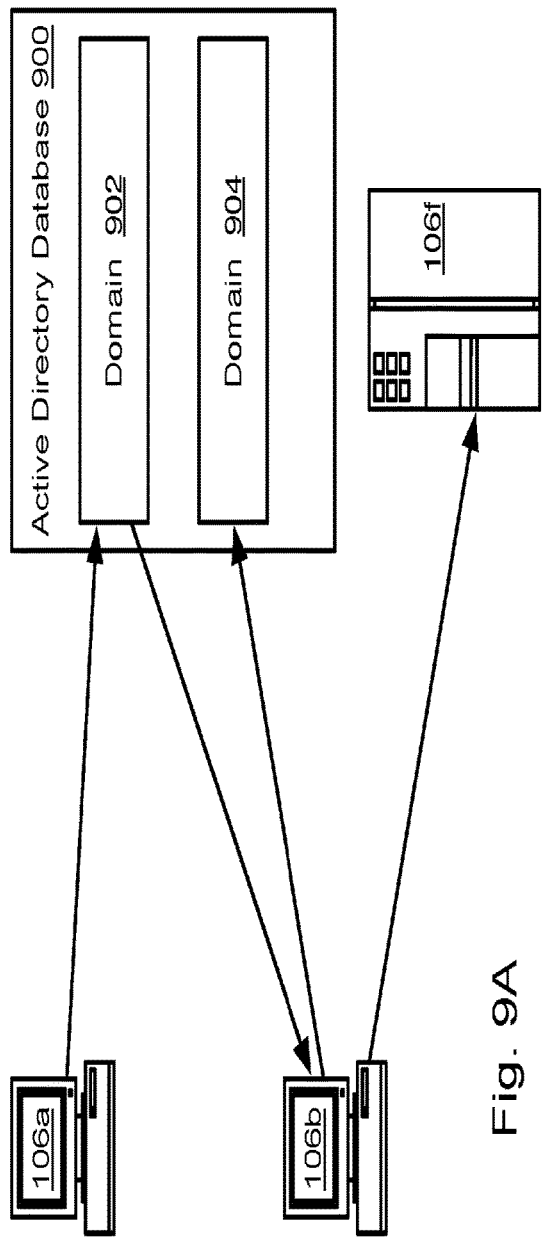
FIG. 9A is a schematic block diagram illustrating exploitation of an active directory server using an infected endpoint.
Figure 9B:
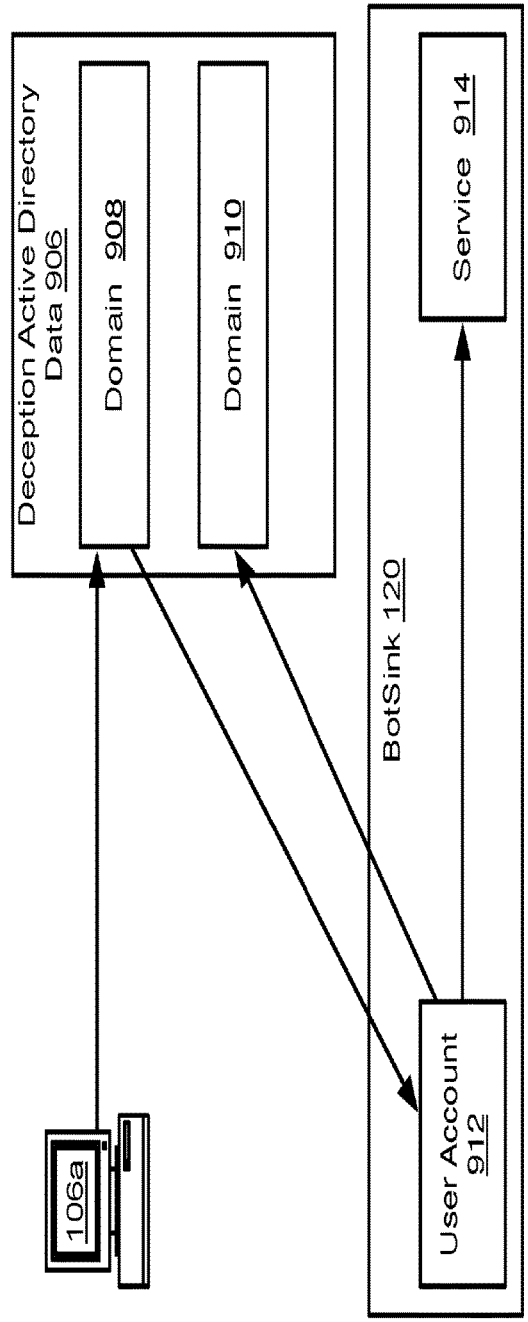
FIG. 9B is a schematic block diagram illustrating prevention of exploitation of an active directory server using an infected endpoint in accordance with an embodiment of the present invention.

FIGS. 9A and 9B illustrate how the methods 600 and 800 may be used to redirect and occupy an attacker. In an unprotected case shown in FIG. 9A, an attacker tool 204 on an infected endpoint 106a uses the active directory API on the infected system to access an active directory database 900 through the active directory server 402. Using this information, the attacker tool 204 uses the network API to request session data in order to identity of an endpoint 106b logged in to the domain account for a domain to which infected endpoint 106a belong. The attacker tool may infect the administrator endpoint 106b and access the active directory database 900 and discover that the admin user account is referenced in domain data 904 defining another group, e.g. an administrator group. The endpoint 106b may further store credentials enabling the endpoint 106b to access a service hosted by server 106f.

Accordingly, the attacker tool 204 on the infected system 106a may attempt to move laterally by requesting information from the active directory server 402 in order to discover the endpoint 106b of the admin user account, infect it, and use it to access the service on server 106f as an administrator.

FIG. 9B illustrates an alternative view seen by an attacker tool 204 on the infected endpoint 106a when the methods according to FIGS. 4 through 6 are implemented. The attacker tool 204 requests information from the active directory server 402. The responses to these requests are modified to reference decoy information, such as decoy active directory data 906 having a same format as the active directory database 900 but with references to computer systems and services being replaced with references to the BotSink 120 (e.g. virtual machines executing on the BotSink 120) and services executing on the BotSink 120.

A response to a request to obtain the identity of an administrator of a domain to which the endpoint 106a belongs using the network API is intercepted and modified to reference to a decoy domain 908. A request for the identity of the administrator of the decoy domain 908 may include a reference to a user account 912 or virtual machine logged in to a user account 912 on the BotSink 120. That user account 912 may be defined as part of an admin domain 910 and that user account 912 may include credentials (e.g., VM for which the user account 912 is logged in may store or reference credentials) that are sufficient to authenticate a user with respect to a service 914 executing on the BotSink 120.

Accordingly, the attacker tool 204 may attempt to move laterally as in the case of FIG. 9A but only engage the BotSink 120. The activities of the attacker tool 204 may be monitored and logged by the BotSink 120 in order to characterize the attacker tool 204 and alerts may be generated to alert and administrator to remove the attacker tool 204 from the infected endpoint 106a. Engaging, monitoring, logging, characterizing, and generation of alerts may be performed according to any of the approaches described in the incorporated applications.

Figure 10:
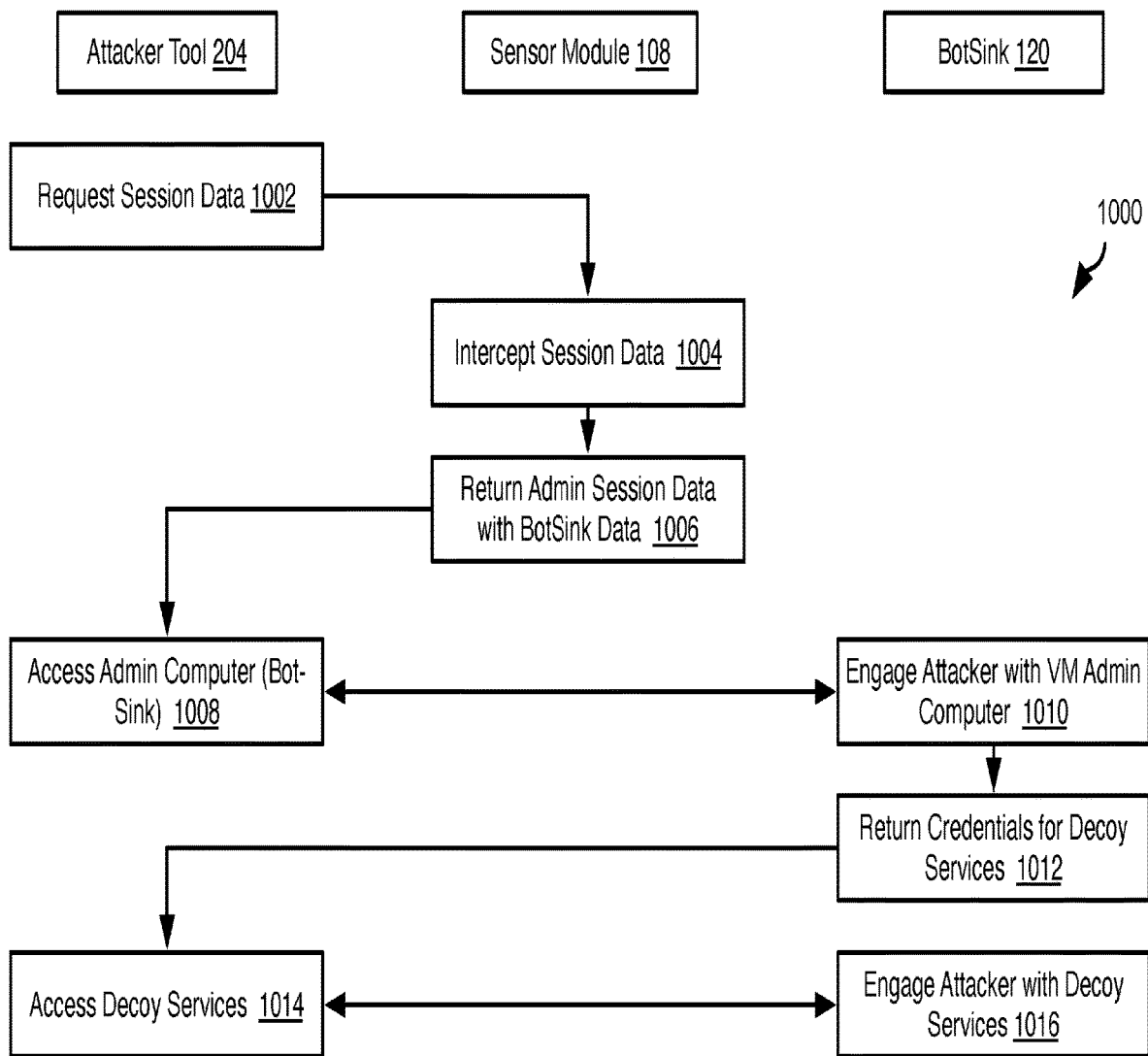
FIG. 10 is a process flow diagram illustrating the use of decoy session data in accordance with an embodiment of the present invention.

FIG. 10 illustrates a method 1000 that may be implemented using the system shown in FIG. 9B. An attacker tool 204 executing on an infected endpoint (e.g., endpoint 106a) requests 1002 session data using a network API for the domain of the infected endpoint, the session data indicating computers (e.g., computers in the same domain) that are connected to the active directory server 402. For example, a network API command for requesting such session data may be used. The sensor module 108 intercepts 1004 a response to this request and determines that the attacker tool 204 is a non-sanctioned application attempting to access restricted data (see FIG. 6). In response, the sensor module 108 returns 1006 the session data with references to one or more computers in the session data replaced with one or more addresses assigned to the BotSink 120. In the alternative, the sensor module 108 intercepts the request for session data and creates a decoy response referencing the BotSink 120 rather than modifying a response from the active directory server 402.

In particular, the IP address of the computer logged in to the administrator account of the domain may be replaced with an IP address assigned to the BotSink 120. For example, the BotSink 120 may acquire IP addresses in various domains as described in the incorporated applications. Each address added to the session data may be assigned to a virtual machine (VM) executing on the BotSink 120.

The attacker tool 204 may then attempt to access 1008 the computer logged in to the administrator account, which is in fact the BotSink 120. The BotSink 120 (e.g., the VM assigned the IP address represented as that of the administrator's computer at step 1006 ("the admin VM")) may then engage 1010 the attacker tool. The activities of the attacker tool 204 with respect to the BotSink 120 may be monitored and stored in order to characterize the attacker tool 204 as described in the incorporated applications.

In particular, the attacker tool 204 may attempt to obtain credentials or identifiers of services cached or stored by the admin VM. In response, these credentials may be returned 1012 to the attacker tool. However, these credentials or identifiers of services may reference services implemented by the BotSink 120, such as by other VMs being executed by the BotSink 120. The attacker tool 204 receives the credentials or identifiers and attempts to access 1014 the services represented by them.

In response, the BotSink 120 authenticates the attacker tool 204 and engages 1016 with the attacker tool 204 using the service, i.e. executes commands from the attacker tool in accordance with the service. Actions of the attacker tool 204 may be monitored and used to characterize the attacker tool 204 as described in the incorporated applications. In addition or as an alternative, interaction with the BotSink 120 at steps 1010, 1012, and 1016 by the attacker tool may trigger an alert or remedial action such as removing the attacker tool 204 from the infected endpoint 106a or isolating (disconnecting) the infected endpoint 106a from a network.

Note that in some embodiments, one of the services implemented on the BotSink 120 may be a decoy active directory service that implements an interface for responding to commands in the active directory API and is programmed to response to these commands with decoy data referencing decoy computers, user accounts, and services implemented on the BotSink 120.

Figure 11:
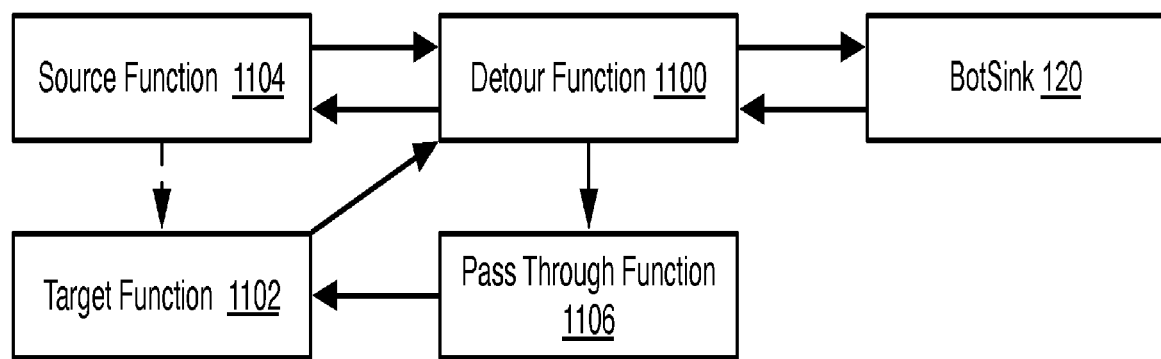
FIG. 11 is a schematic block diagram of configuration of dynamic link libraries in accordance with an embodiment of the present invention.

Referring to FIG. 11, in some implementations, intercepting of system calls according to the foregoing and subsequent embodiments may be implemented by substituting a reference to a detour function 1100 in the place of a target function 1102 in source function 1104 such that when the source function 1104 executes code that would have called the target function 1102, the detour function 1100 is called instead. For example, this reference replacement may be made in dynamic link libraries (DLL) of the operating system on the endpoint 106a-106g or other files of the operating system.

The detour function 1100 may perform evaluations described herein to determine whether the call should be handled in cooperation with the BotSink 120 or should be passed on to the target function. The detour function 1100 may also perform actions described herein relating to substituting decoy information in a response to a call to the target function 1102. Where it is determined that the call should be routed to the target function 110 this may be performed by way of a pass through function 1106 or "trampoline" function, which invokes the target function 1102 using arguments passed to the detour function 1100 by the source function 1104. The target function 1102 may return its result to the detour function 1100, which then returns the result to the source function 1104. Alternatively, the result may be routed to the detour function 1100 by way of the pass through function 1106. Where the function call is routed to the BotSink 120, a result form the BotSink 120 may be routed to the source function 1104 by the detour function 1100.

The processing of system calls according to the methods disclosed herein may be preceded by modifying source functions making the system calls on the endpoint 106a-106g to refer to one or more detour functions as described above.

Figure 12:
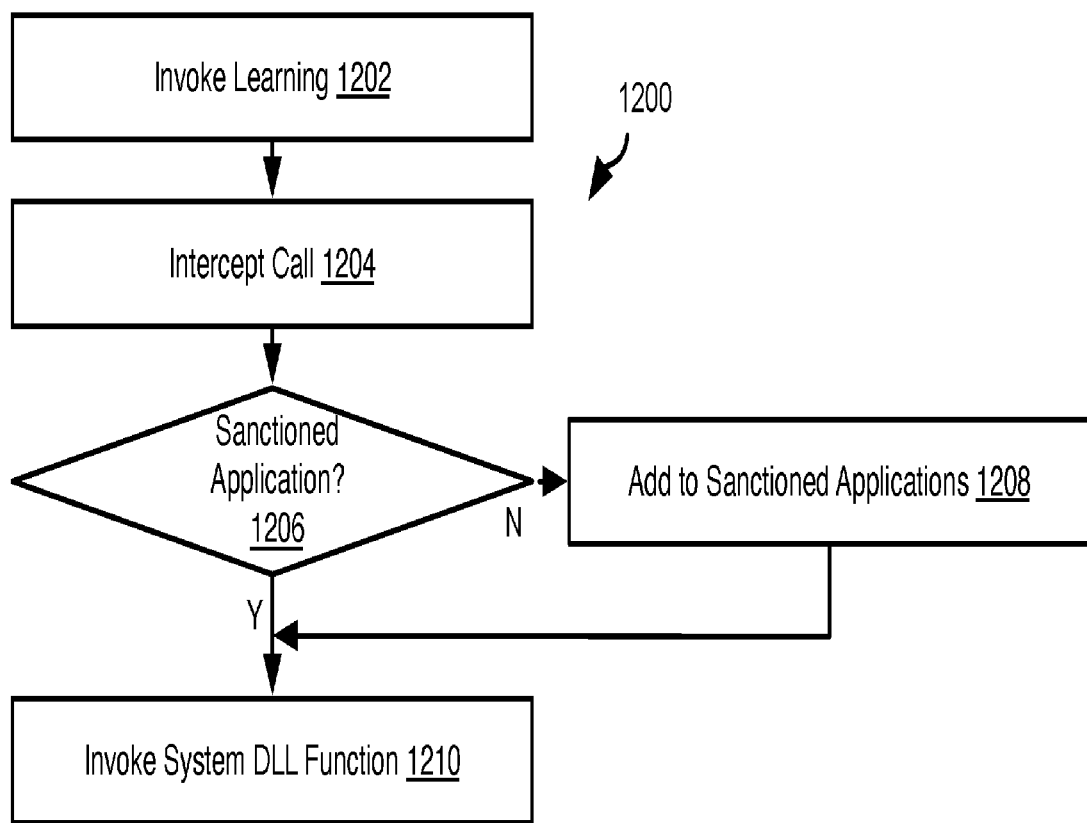
FIG. 12 is a process flow diagram of a method for intercepting system calls in accordance with an embodiment of the present invention.

FIG. 12 illustrates a method 1200 for identifying whitelisted applications. For a period, e.g. 1 day, 2 days, 1 week, etc. following processing of source functions 1104 on the operating system of one or more endpoints 106a-106g to reference the detour function(s) 1100, a learning mode may be invoked 1202. During this period the detour functions 1100 may operate in a learning mode in which all calls to a target function 1102 are intercepted 1204 and the detour function 1100 invokes 1210 the target function 1102. I.e., a call to a target function 1102 will be passed to the target function 1102. The detour function 1100 may report data regarding calls during the learning period, particularly identifiers of applications or processes that issue the call, e.g., a registry key, executable name, file system path to the executable, hash of the executable, or other identifier of the calling application or process. The detour function 1100 may make this report to the BotSink 120 for each system call or make a report of each unique identifier that made a call during the learning period. Note also that in some embodiments, not all system calls are intercepted, i.e. have references thereto replaced with detour function(s) 1100. For example, either (a) only references to certain target functions 1102 are replaced with references to detour function(s) 1100 or (b) some functions 1100 simply pass a function call to a corresponding target function 1100 while others perform interception, inspection, and substitution functions as described herein.

If the application or process that issued the intercepted call is not found 1206 to be in a list of sanctioned applications, it is added 1208 to the list, i.e., the unique identifier of the application or process is added to the list. If the application or process that issued the intercepted call is found 1206 to already be in a list of sanctioned applications, then step 1210 is performed without repeating step 1208.

In some embodiments, each endpoint 106a-106g creates its own list of sanctioned applications during the learning period and then sends these to the BotSink 120, which then compiles a list of sanctioned applications that are then distributed back to the endpoints 106a-106g. Alternatively, the endpoints 106a-106g may coordinate with one another to share identifiers of sanctioned applications such that each endpoint 106a-106g has the same list. In another approach, each endpoint 106a-106g compiles its own list of sanctioned applications and uses it according to the methods described herein without obtaining identifiers of other applications identified by other endpoints 106a-106g.

Figure 13:
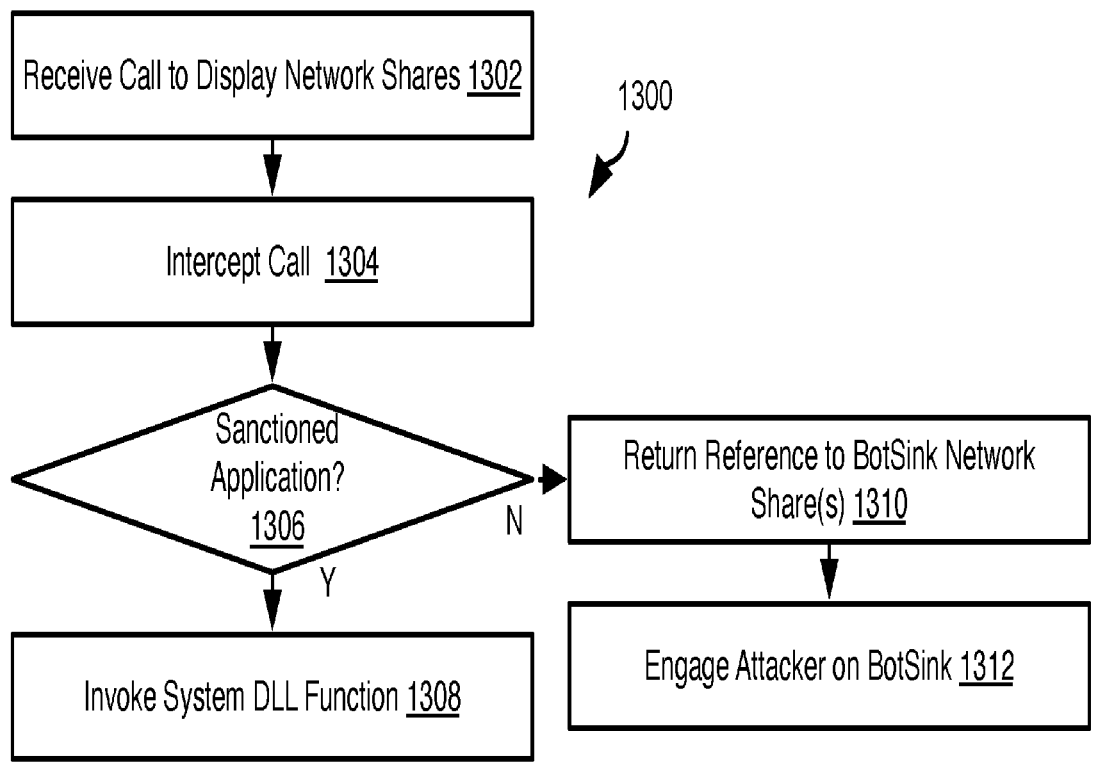
FIG. 13 is a process flow diagram of a method for intercepting calls to list network shares in accordance with an embodiment of the present invention.

Referring to FIG. 13, the illustrated method 1300 may be executed on an endpoint 106a-106g. For example, the method 1300 may be executed by a detour function 1104, sensor module 108, or other component executing on the endpoint 106a-106g (hereinafter "the endpoint").

The method 1300 may include receiving 1302 a call to display network shares mounted to the endpoint. Network shares are file systems on other computers remote from the endpoint that are mounted to the file system of the endpoint and accessed through the file system of the endpoint. The call may be the "net use" command in the MICROSOFT operating system. Other function calls may include GetLogicalDrives ( ), GetVolumeinformation ( ). This call may be intercepted 1304 by virtue of a reference to it being a call to a detour function 1100 substituted for a target function corresponding to the call. Interception may also be performed by a sensor module 108 or according to any interception approach described herein.

The detour function 1100 or other component performing the method 1300, may evaluate 1306 whether the source of the call is a sanctioned application, e.g. a unique identifier of the source of the call is in the list of sanctioned applications. If so, the detour function 1100 invokes 1308 the target function 1102, i.e. the "net use" function and returns a result of the function to the source of the call. If not, then the detour function 1100 returns 1310 a simulated result that includes a reference to a network share on the BotSink 120. For example, the actual response to the "net use" function call. The simulated result may be obtained by the detour function 1100 issuing a call to the corresponding target function 1102, i.e. the net use call, receiving the response, and replacing references to network shares with references to the BotSink 120. In other approaches, the simulated result is generated without generating a call to the target function 1102.

For example, the actual result from the "net use" function may be:

| Status | Local | Remote | Network |
|---|---|---|---|
| OK | Z: | \\network426.example.com | Microsoft Windows Network |

The result returned to the source of the call may be:

| Status | Local | Remote | Network |
|---|---|---|---|
| OK | Z: | \\network521.example.com | Microsoft Windows Network |

In this example, "network426.example.com" may be an actual server providing a network share. "network521.example.com" may be the domain name assigned to the BotSink 120.

Attempts by the source of the call to access the network shares may result in the source of the call engaging 1312 the BotSink 120. For example, the BotSink 120 may create a network share referenced by the result returned at step 1310. Any attempt to access the share may be responded to by providing simulated files. Attempts to access the network share may be monitored by connection attempts on BotSink 120 to host network426.example.com or by monitoring the DNS queries to the host network426.example.com. Attempts to access the BotSink 120 through the references in the modified response may invoke generation of an alert or other action to reduce risk to the endpoint or other network resources, such as blocking access to the endpoint or other network resources by the source address or executable that is the source of the call.

Figure 14:
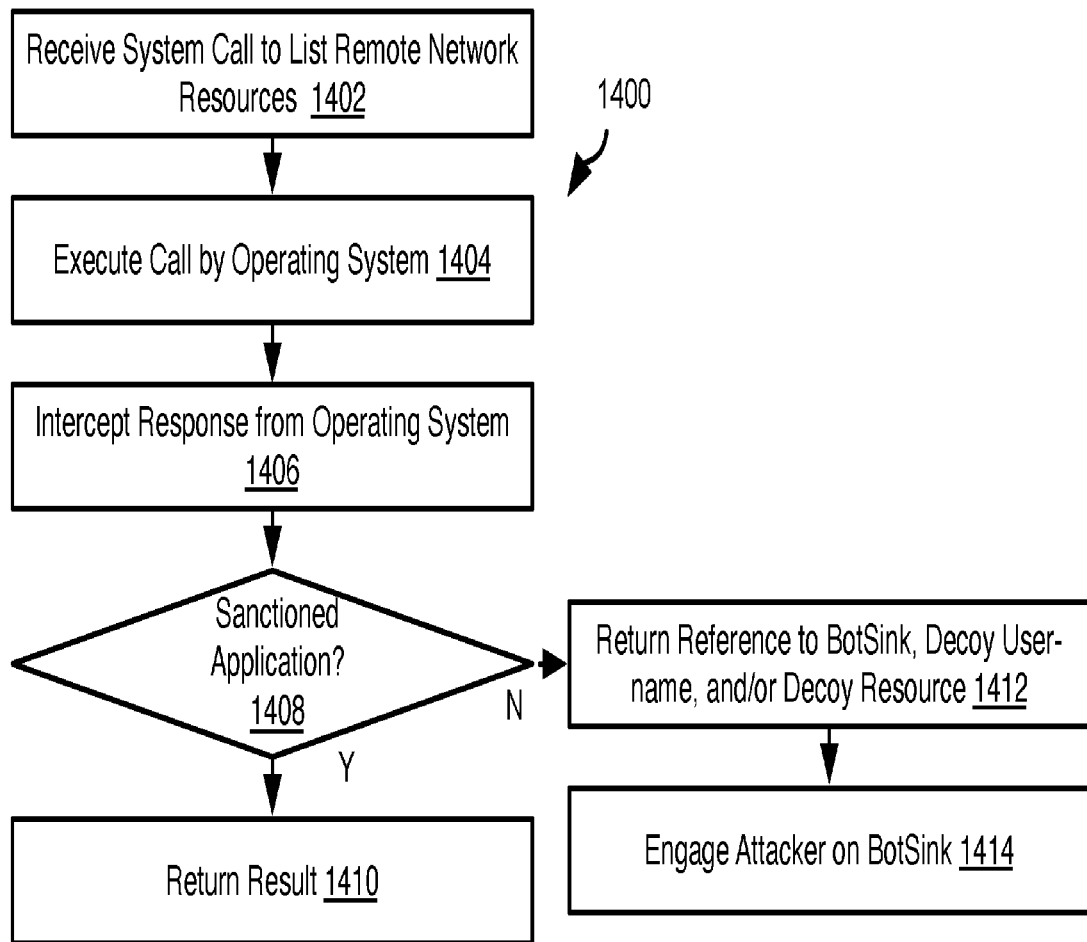
FIG. 14 is a process flow diagram of a method for intercepting calls to list remote network resources in accordance with an embodiment of the present invention.

Referring to FIG. 14, the illustrated method 1400 may be executed on an endpoint 106a-106g. For example, the method 1400 may be executed by a detour function 1100, sensor module 108, or other component executing on the endpoint.

The method 1400 may include receiving 1402 a call to list a remote network resource or request to list credentials managed by a credential manager, or a request to list of domain controllers accessible from the endpoint, or a request to enumerate remote network shares. This call may be intercepted 1304 by virtue of a reference to it being a reference to a detour function 1100 when the interception DLL was loaded into the application or process making the call. Interception may also be performed by a sensor module 108 or according to any interception approach described herein.

The detour function 1100 or other component performing the method 1400, may execute 1404 the call on the operating system of the endpoint, such as by invoking the corresponding target function 1102. The detour function 1100 may intercept 1406 a response to the call from the operating system. If the source of the call is found 1408 to be a sanctioned application, the result from the operating system is returned 1410 to the source of the call. The manner in which the source is determined to be sanctioned may be according to the approach of any of the methods described hereinabove.

If not, then the detour function 1100 returns 1412 a simulated result that includes a reference to a network share on the BotSink 120. For example, response from step 1406 may be modified to include references to the BotSink 120 in the place of references to network resources.

For example, the system call may be to an API (application programming interface) of a credential manager, such as that provided by the WINDOWS CREDENTIAL MANAGER API. For example, such a call may include "CredEnumerateA( ), CredReadA ( ), or other function call defined in Advapi32.dll. The result from the operating system received at step 1406 may be:

TERMSRV/network426. internalcorp.com, UserName rdpuser@internalcorp.com, Password: HASH1

The modified result returned to the source of the call may be TERMSRV/network521. internalcorp.com, UserName decoyuser@internalcorp.com, Password: HASH2 where network426. internalcorp.com is a server for which the credential manager has a credential and network521. internalcorp.com is a domain name assigned to the BotSink 120. Note that the username and hash of the password are also altered in this example.

In another example, the call intercepted at step 1402 is a call to list domain controllers. Such a call may include "WNetOpenEnumA( )", "WNetEnumResourceA( )", or other function call defined in Mpr.dll of the Win32 API. In another example, the call is "NetShareEnum ( . . . )" in Netapi32.dll of the Win32 API.

For example, the source of the call may issue the call "net view bantestadoO5." The operating system may return the result:

| Shared resources at bantestad05 | | |
|---|---|---|
| Share name | Type Used as | Comment |
| NETLOGON | Disk | Logon server share |
| SYS VOL | Disk | Login server share |

In particular, the domain controllers may return NETLOGON and SYSVOL shares type. A result referencing these shares would then be modified to either (a) remove them to hide them from malware or (b) replace them with references to a decoy domain controller implemented on the BotSink 120. This hinders an attacker from fingerprinting or finding the domain controllers of a network.

In another example, the call received at step 1402 is to find network shares on a remote machine using a call such as WNetOpenEnumA( ), WNetEnumResourceA( ) in the Mpr.dll of the Win32 API or NetShareEnum ( ) in the Netapi32.dll of the Win32 API.

For example, the result of a call such as "net view sx1.testsystem/all" may include:

| Shared resources at sx1.testsystem | | | |
|---|---|---|---|
| Share name | Type | Used as | Comment |
| ADMIN$ | Disk | | Remote Admin |
| SHARE_CIFS | Disk | | |
| C$ | Disk | | Default share |
| IPC$ | IPC | | Remote IPC |

The entries of this result indicate network shares from a remote system. These network shares may be hidden from a non-sanctioned application according to the methods described herein. For example, for a non-sanctioned application, the entries may simply be deleted, returning a response at step 1410 that does not indicate the presence of any network shares. This enables the hiding of these network shares from malware so that it cannot find these shares to exploit them or spread a ransomware-type attack. Alternatively, network shares on the BotSink 120 may be substituted in the result.

In another example, the call received at step 1402 is a request to get information about network servers and/or computers. For example, the "NetServerEnum( )" call in the Netapi32.dll of the Win32 APL.

For example, the input call may return "NETWORK.426" when executed by the operations, where NETWORK.426 is an identifier of an actual server on the network. The detour function 1100 may return NETWORK.521, which refers to the BotSink 120.

In another example, the call at step 1402 is a call to enumerate a registry of recently accessed servers or other computers. Such a call may include RegEnum Value( ) in the Advapi32.dll of the Win32 API, which enumerates a list of remote servers or computers recently accessed using a remote desktop connection.

The result at step 1406 may read as follow:

HKEY_CURRENT_USER\Software\Microsoft\Terminal server Client\Default MRU0 REG_SZ NETWORK.426

The modified result returned at step 1410 may read as follows:

HKEY_CURRENT_USER\Software\Microsoft\Terminal server Client\Default MRU0 REG_SZ NETWORK.521 where NETWORK.426 refers to a server in the network other than the BotSink 120 and NETWORK.521 refers to the BotSink 120.

As for other embodiments, attempts to access the network resources in the modified response will be received by the BotSink 120, which may then engage 1414 the source of the call in order to detect and characterize it. Attempts to access the BotSink 120 through the references in the modified response may invoke generation of an alert or other action to reduce risk to the endpoint or other network resources, such as blocking access to the endpoint or other network resources by the source address or executable that is the source of the call.

Figure 15:
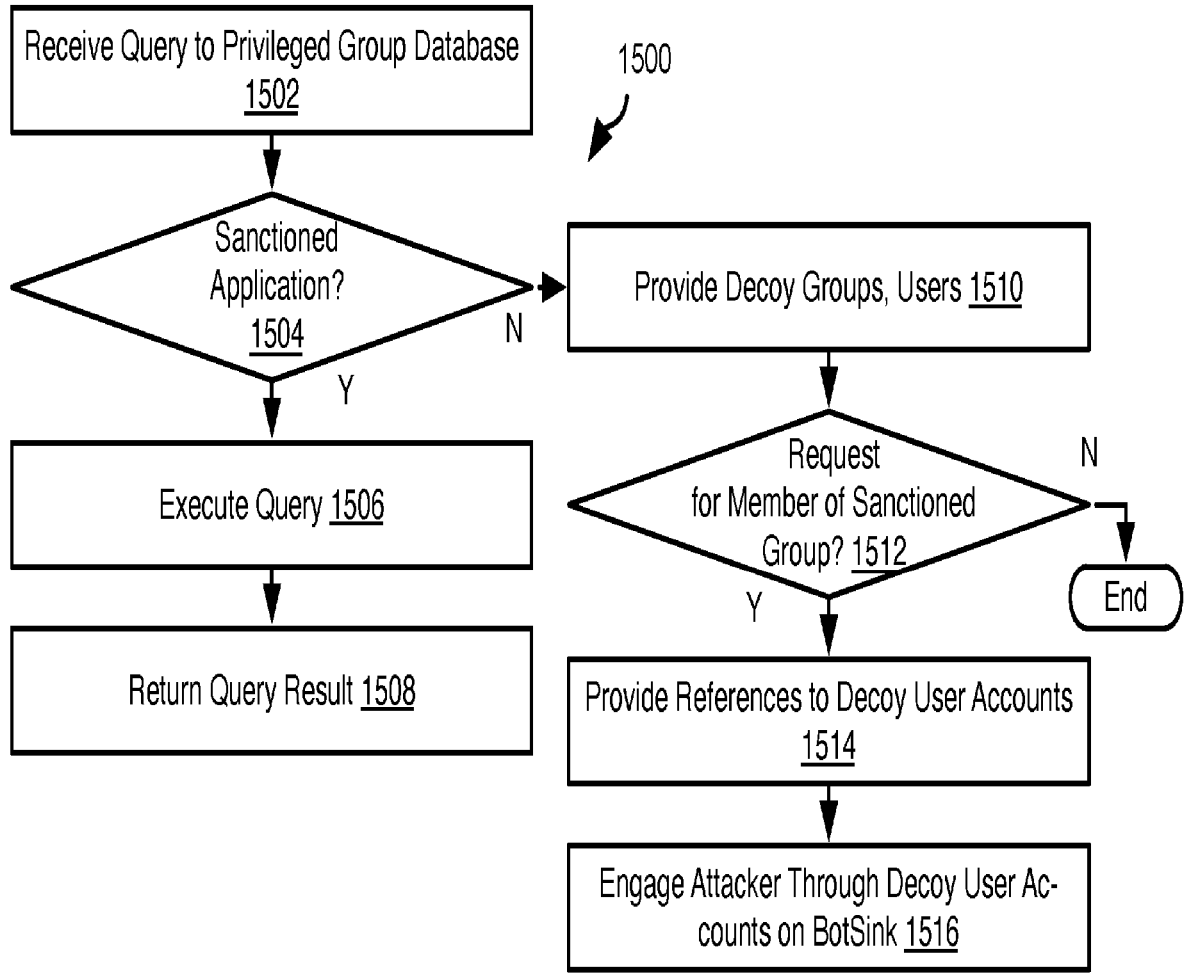
FIG. 15 is a process flow diagram of a method for intercepting calls to a database for a privileged group in accordance with an embodiment of the present invention.

Referring to FIG. 15, the illustrated method 1500 relates to a circumstance in which malware obtains a local administrative credential for a security account manager (SAM) database, such as from a local security authority subsystem service (LSAS) process. In this case, the endpoint receives 1502 a query to obtain information regarding a privileged group database. The privileged group may be referenced by the data obtained by the malware. The query may be a call to SamEnumerateGroupsInDomain ( ), SamGetMembersInGroup ( ) in the Win32 API.

If the query is found 1504 to be from a sanctioned application according to any of the approaches described herein, then the end point executes 1506 the query and returns 1508 a result of the query to the application, process, or remote computer system from which the query was received. If the query is not found 1504 to be from a sanctioned application, the endpoint provides 1510 decoy data to the source of the call, i.e. data including references to users, groups, or both users and groups that do not correspond to actual users and groups on the endpoint or in the production SAM database of the endpoint and network 100. The decoy users and/or groups may reference decoy users and groups defined on the BotSink 120, e.g., in a decoy SAM database on the BotSink 120.

If a request is found 1512 to have been received that references a decoy user or group returned at step 1510, the method 1500 may include providing decoy information from decoy accounts corresponding to the decoy user or group referenced in the request. For example, this may be performed in response to receiving a SamGetMembersInGroup ( ) call that references a decoy group provided at step 1510. Steps 1512 and 1514 may be performed any number of times. In particular, decoy data may be generated in response to each request such that an attacker will be fed decoy data to occupy and deceive the attacker.

Further attempts to access or exploit the user accounts may be directed to the BotSink 120 that may engage 1516 the attacker, such as by implementing the user accounts on the BotSink 120 and providing access to services in the context of the user accounts on the BotSink 120. These activities may be monitored and characterized. Engaging 1516 may invoke generation of an alert or other action to reduce risk to the endpoint or other network resources, such as blocking access to the endpoint or other network resources by the source of the call.

Figure 16:
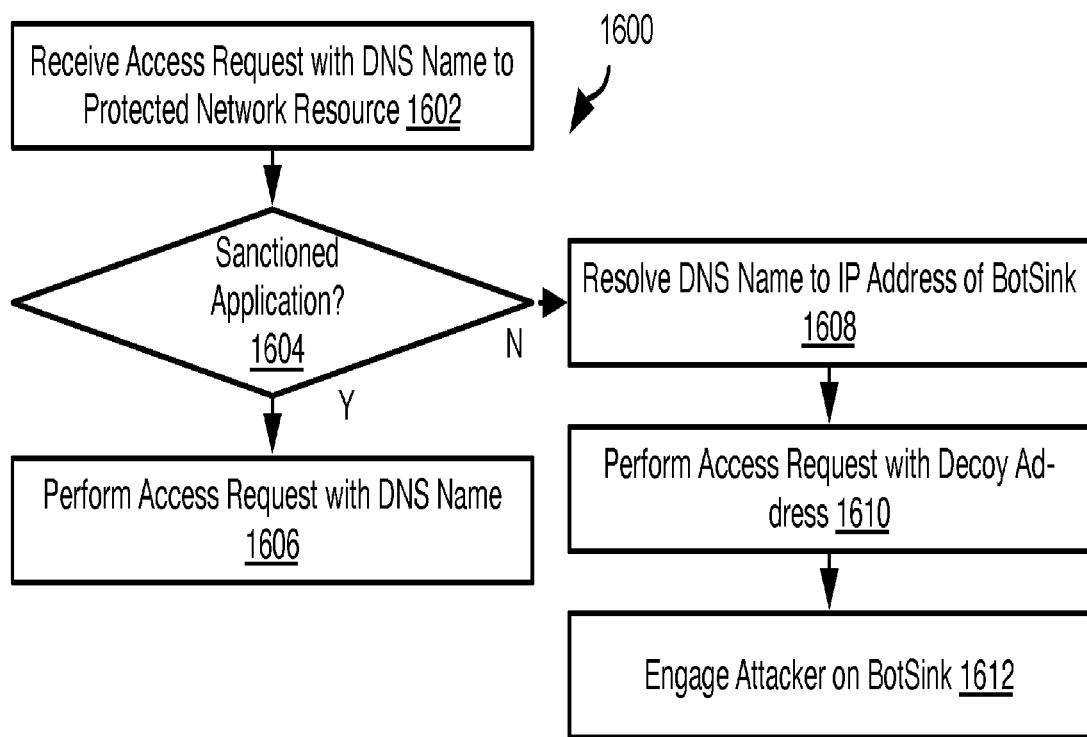
FIG. 16 is a process flow diagram of a method for intercepting access requests with DNS names in accordance with an embodiment of the present invention.

Referring to FIG. 16, in some embodiments an endpoint 106a-106g may execute the illustrated method 1600. A source may issue a call that references a DNS (domain name service) address that must be resolved to an IP (internet protocol address). Such a call may include DNSQuery_A ( ) from the Dnsapi.dll of the Win32 API. This call is received 1602 by the endpoint, such as by way of a detour function 1100, which evaluates 1604 whether the call was received from a sanctioned application according to any of the approaches described herein. If so, the endpoint invokes 1606 performing of the access request. In some embodiments, prior to performing step 1606, the endpoint resolves the DNS address to an IP address, such as by issuing a call with the DNS address to a DNS server and receiving a response including the IP address. The endpoint may then invoke performing of the access request with the IP address by the operating system of the endpoint, i.e. invoke the target function 1102 corresponding to the call. Alternatively, the arguments of the call, including the DNS address may be passed to the target function 1102 without first resolving the DNS address to an IP address. The target function 1102 may then execute with respect to the IP address. For example, if the functions 1104, 1106 are a "ping" command, the target function 1102 will ping the BotSink 120 and return a result of that function, i.e. when and whether replies to ping messages were received, a delay between a ping message and a reply, and the IP address of the destination of the ping message.

If the source of the call is not found 1604 to be a sanctioned application, the DNS address may be resolved 1608 to an address that does not actually correspond to the DNS address. Instead, the DNS address is resolved 1608 to one of one or more IP addresses assigned to the BotSink 120. The access request may be performed 1610, e.g. target function 1102 invoked, with the arguments from the call received at step 1602 except that the DNS address is replaced with the IP address from step 1608. The result of the access request is then returned to the source of the access request. For example, where the access request is a ping command, the result of pining the BotSink 120 may be returned to the source. As for other embodiments disclosed herein, attempts to communicate using the information returned may result in engaging 1612 the attacker as described above.

Figure 17:
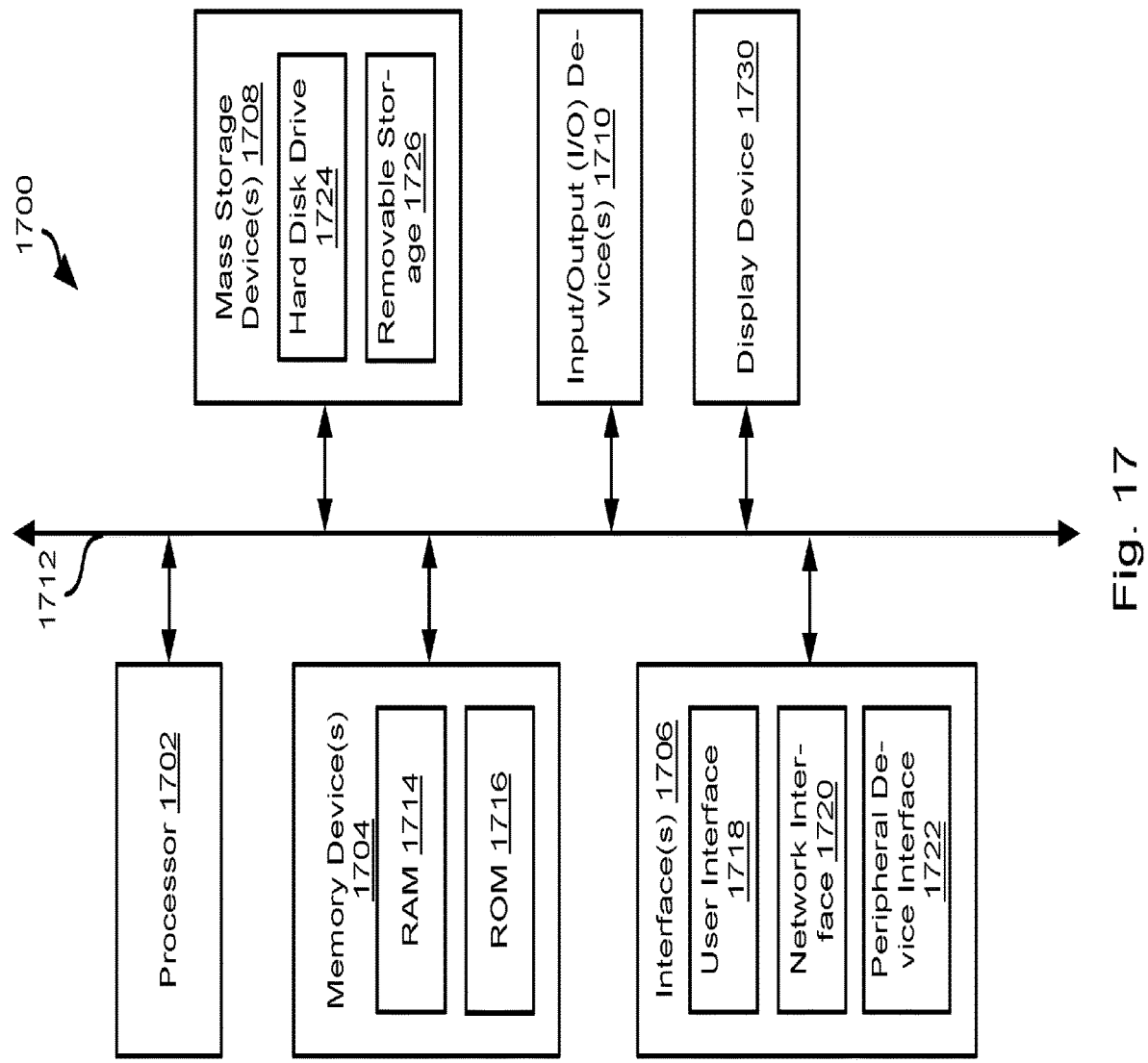
FIG. 17 is a schematic block diagram of a computer system suitable for implementing methods in accordance with embodiments of the present invention.

FIG. 17 is a block diagram illustrating an example computing device 1700 which can be used to implement the system and methods disclosed herein. The endpoints 106a-106g, management server 112, BotSink 120, attacker system 122, and active directory server 402 may also have some or all of the attributes of the computing device 1700. In some embodiments, a cluster of computing devices interconnected by a network may be used to implement any one or more components of the invention.

Computing device 1700 may be used to perform various procedures, such as those discussed herein. Computing device 1700 can function as a server, a client, or any other computing entity. Computing device can perform various monitoring functions as discussed herein, and can execute one or more application programs, such as the application programs described herein. Computing device 1700 can be any of a wide variety of computing devices, such as a desktop computer, a notebook computer, a server computer, a handheld computer, tablet computer and the like.

Computing device 1700 includes one or more processor(s) 1702, one or more memory device(s) 1704, one or more interface(s) 1706, one or more mass storage device(s) 1708, one or more Input/Output (I/O) device(s) 1710, and a display device 1730 all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM) 1714) and/or nonvolatile memory (e.g., read-only memory (ROM) 1716). Memory device(s) 1704 may also include rewritable ROM, such as Flash memory.

Mass storage device(s) 1708 include various computer readable media, such as magnetic tapes, magnetic disks, optical disks, solid-state memory (e.g., Flash memory), and so forth. As shown in FIG. 17, a particular mass storage device is a hard disk drive 1724. Various drives may also be included in mass storage device(s) 1708 to enable reading from and/or writing to the various computer readable media. Mass storage device(s) 1708 include removable media 1726 and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, lenses, CCDs or other image capture devices, and the like.

Display device 1730 includes any type of device capable of displaying information to one or more users of computing device 1700. Examples of display device 1730 include a monitor, display terminal, video projection device, and the like.

Interface(s) 1706 include various interfaces that allow computing device 1700 to interact with other systems, devices, or computing environments. Example interface(s) 1706 include any number of different network interfaces 1720, such as interfaces to local area networks (LANs), wide area networks (WANs), wireless networks, and the Internet. Other interface(s) include user interface 1718 and peripheral device interface 1722. The interface(s) 1706 may also include one or more user interface elements 1718. The interface(s) 1706 may also include one or more peripheral interfaces such as interfaces for printers, pointing devices (mice, track pad, etc.), keyboards, and the like.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 1712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1700, and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

We claim:

1. A computer-implemented method for deceiving a source attempting to access target data, the method comprising:
   configuring, by a computer system, a system call to refer to a detour function;
   receiving, by the computer system from a source, a request to access target data via the system call;
   determining, by the computer system via the detour function, whether the source is sanctioned; and
   returning, by the computer system in response to determining that the source is not sanctioned, decoy data to the source, wherein the decoy data is different from the target data, the decoy data configured to mimic the target data,
      wherein the computer system comprises a computer processor and an electronic storage medium.

2. The computer-implemented method of claim 1, wherein the decoy data is configured to mimic a format of the target data.

3. The computer-implemented method of claim 2, wherein the format comprises one or more of a word processor document, spreadsheet, database, credential, configuration file, browser history, or a listing of recently accessed files.

4. The computer-implemented method of claim 1, wherein the source comprises an attacker system.

5. The computer-implemented method of claim 1, wherein the target data comprises production data.

6. The computer-implemented method of claim 1, wherein the computer system comprises an endpoint.

7. The computer-implemented method of claim 6, wherein the endpoint comprises a production device.

8. The computer-implemented method of claim 1, wherein the decoy data does not comprise production data.

9. The computer-implemented method of claim 1, wherein the request to access target data comprises a read command or information request.

10. The computer-implemented method of claim 1, wherein whether the source is sanctioned is determined by determining whether the source comprises a sanctioned application.

11. The computer-implemented method of claim 1, wherein the decoy data is stored locally on the computer system.

12. The computer-implemented method of claim 1, wherein the decoy data is stored on another location and is accessed by the computer system.

13. A system for deceiving a source attempting to access target data, the system comprising:
   one or more computer readable storage devices configured to store a plurality of computer executable instructions; and
   one or more hardware computer processors in communication with the one or more computer readable storage devices and configured to execute the plurality of computer executable instructions in order to cause the system to:
   configure a system call to refer to a detour function;
   receive a request to access target data via the system call;
   determine, via the detour function, whether the source is sanctioned; and
   return, in response to determining that the source is not sanctioned, decoy data to the source, wherein the decoy data is different from the target data, the decoy data configured to mimic the target data.

14. The system of claim 13, wherein the decoy data is configured to mimic a format of the target data.

15. The system of claim 14, wherein the format comprises one or more of a word processor document, spreadsheet, database, credential, configuration file, browser history, or a listing of recently accessed files.

16. The system of claim 13, wherein the target data comprises production data.

17. The system of claim 13, wherein the decoy data does not comprise production data.

18. The system of claim 13, wherein whether the source is sanctioned is determined by determining whether the source comprises a sanctioned application.

19. The system of Claim 13, wherein the decoy data is stored locally.

20. The system of Claim 13, wherein the decoy data is stored on another location and is accessed by the system.

* * * * *